(12) United States Patent
Lee et al.

(10) Patent No.: US 8,697,667 B2
(45) Date of Patent: Apr. 15, 2014

(54) CYCLODEXTRIN-MODIFIED POLYAMINES FOR DELIVERY OF THERAPEUTIC MOLECULES

(75) Inventors: Ki-Bum Lee, Monmouth Junction, NJ (US); Birju Shah, Piscataway, NJ (US); Prasad Subramaniam, Edison, NJ (US); Cheoljin Kim, North Brunswick, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 0 days.

(21) Appl. No.: 13/270,261

(22) Filed: Oct. 11, 2011

(65) Prior Publication Data

US 2012/0115962 A1 May 10, 2012

Related U.S. Application Data

(60) Provisional application No. 61/393,958, filed on Oct. 18, 2010.

(51) Int. Cl.
| | | |
|---|---|---|
| *C12N 15/11* | (2006.01) | |
| *A61K 48/00* | (2006.01) | |
| *C07H 21/02* | (2006.01) | |
| *C07H 21/04* | (2006.01) | |
| *A61K 31/535* | (2006.01) | |

(52) U.S. Cl.
USPC ............... 514/44 A; 514/44 R; 514/234.5; 514/58; 536/24.5

(58) Field of Classification Search
None
See application file for complete search history.

(56) References Cited

U.S. PATENT DOCUMENTS

| 4,869,904 A | * | 9/1989 | Uekama et al. | ............... | 424/400 |
| 5,180,716 A | * | 1/1993 | Yaksh et al. | ................. | 514/58 |
| 5,620,961 A | * | 4/1997 | Markovic et al. | ............... | 514/23 |

FOREIGN PATENT DOCUMENTS

WO   WO 2006/093108   * 9/2006

OTHER PUBLICATIONS

Osaki et al (Cancer Res 1994;54:5258-526).*
Machine translation of WO 2006/093108, (2006).*
Arima et al (Sensors 2009, 9, 6346-6361).*
Lee et al (Drug Development and Industrial Pharmacy, 2009; 35(9): 1113-1120).*
Bumcrot et al. "RNAi therapeutics: a potential new class of pharmaceutical drugs." Nature Chemical Biology 2: 711-719. (Dec. 2006) Abstract only.
Castanotto D., et al. "The promises and pitfalls of RNA-interference-based therapeutics." Nature 457(7228): 426-433. (Jan. 22, 2009). Abstract only.
Christie, RJ., et al., "Delivering the code: polyplex carriers for deoxyribonucleic acid and ribonucleic acide interference therapies", Endocrinology 151(2):466-473, (Feb. 2010). Abstract only.
Collins, I, et al. "New approaches to molecular cancer therapeutics." Nat. Chem. Biol. 2(12): 689-700. (Dec. 2006). Abstract only.
Engelman, JA, Nat. Rev. Cancer 9(8):550-562, (Aug. 2009); "Targeting PI3K signalling in cancer: opportunities, challenges and limitations". Abstract only.
Gabhann, F., et al. "Gene therapy from the perspective of systems biology." Curr. Opin. Mol. Ther. 12(5):570-577. (Oct. 2010) Abstract only.
Khramov, AN, et al., "Enhanced microdialysis recovery of some tricyclic antidepressants and structurally related drugs by cyclodextrin-mediated transport", Analyst 124(7):1027-1033, (Jul. 1999). Abstract only.
Kim, DJ, et al. "Strategies for silencing human disease using RNA interference." Nat. Rev. Genet. 8(3):173-184. (Mar. 2007). Abstract only.
Knesl, P, et al., "Improved synthesis of substituted 6,7-dihydroxy-4-quinazolineamines: tandutinib, erlotinib and gefitinib", Molecules Apr. 10, 2006; 11(4):286-297. Abstract only.
Lai et al., Cancer Res. 70:3647-3656, (Apr. 13, 2010) "CUDC-101, a Multitargeted Inhibitor of Histone Deacetylase, Epidermal Growth Factor Receptor, and Human Epidermal Growth Factor Receptor 2, Exerts Potent Anticancer Activity".
Lee, P., et al., Drug Dev. Ind. Pharm. 35(9):1113-1120, (Sep. 2009); "Gefitinib-cyclodextrin inclusion complexes: physico-chemical characterization and dissolution studies". Abstract only.
Pack, DW, et al., Nat. Rev. Drug Disc. 4(7):581-593, (Jul. 2005); "Design and development of polyers for gene delivery". Abstract only.
Pun et al., Bioconjug. Chem. 15(4):831-840, (Jul.-Aug. 2004) "Cyclodextrin-modified polyethylenimine polymers for gene delivery". Abstract only.
Rasheed, A, et al., Sci. Pharm. 76:567-598, (Nov. 2008) "Cyclodextrins as Drug Carrier Molecule: A Review".
Stowell et al., J. Med. Chem 38(8):1411-1413, (Apr. 1996); "The synthesis of N-hydroxy-N'-phenyloctanediamide and its inhibitory effect on proliferation of AXC rat prostate cancer cells". Abstract only.
Tang, W., et al., Nat. Prot. 3(4):691-697, (2008). "Facile systhesis of mono-6-amino-deoxy-alpha-, beta-, gamma-cyclodextrin hydrochlorides for molecular recognition, chrial separation and drug delivery". Abstract only.
Tomalia, DA, et al., Polymer J. 17:117-132, (1985); "A New Class of Polymers: Starburst-Dendritic Macromolecules". Abstract only.
Wang, H, et al., Chem. Comm. 46(11):1851-1853, (Mar. 21, 2010) "A small library of DNA-encapsulated supramolecular nanoparticles for targeted gene delivery". Abstract only.
Wang et al., Angew. Chemie-Int. Ed. 48(24):4344-4348, (2009); "A Supramolecular Approach for Preparation of Size-Controllable Nanoparticles". Abstract only.

* cited by examiner

*Primary Examiner* — Richard Schnizer
(74) *Attorney, Agent, or Firm* — Fox Rothschild LLP

(57) ABSTRACT

The present invention is directed to drug delivery vehicles comprising one or more cyclodextrin moieties conjugated to a dendritic polyamine for the delivery of small molecule and protein therapeutic molecules and nucleic acid therapeutic molecules, and methods of making and using the delivery vehicles.

6 Claims, 28 Drawing Sheets

β-Cyclodextrin

24

25 (DeXAM 3)

26

23

27

28 (polyamine of DeXAM 4)

+

Tosylated β-Cyclodextrin

2

→ c

29

CYCLODEXTRIN-MODIFIED POLYAMINES FOR DELIVERY OF THERAPEUTIC MOLECULES

CROSS REFERENCE TO RELATED APPLICATIONS

This application claims the benefit of U.S. Provisional Application No. 61/393,958 filed Oct. 18, 2010, the disclosure of which is incorporated herein by reference in its entirety.

STATEMENT REGARDING FEDERALLY SPONSORED RESEARCH

This invention was made, at least in part, with government support under Director's Innovator Award No. 1DP20D006462-01 awarded by the National Institutes of Health. The U.S. government has certain rights in the invention.

BACKGROUND OF THE INVENTION

Advances in the fields of chemical genetics and molecular cell biology have led to the development of genetic manipulation-based therapies for cancer. Gabhann et al. (2010) *Curr. Opin. Mol. Ther.* 12:570-577. Such genetic manipulation methods typically rely on either the small-molecule/protein modalities (Collins et al. (2006) *Nat. Chem. Biol.* 2:689-700) or RNA interference (RNAi)-based modalities (Kim et al. (2007) *Nat. Rev. Gen.* 8:173-184), each having their own advantages and disadvantages. For example, RNAi therapeutics can provide attractive solutions to the major shortcomings of the conventional therapeutics, including difficulty in lead identification and complex synthesis of small organic molecules and proteins, and potentially can be applicable to all molecular targets for cancer therapy. Bumcrot et al. (2006) *Nat. Chem. Biol.* 2:711-719. However, RNAi-based therapeutics, such as small interfering RNA (siRNA) and micro RNA (miRNA), are inherently antagonistic and their downstream effects (i.e. gene-silencing) are delayed, compared to those of conventional small-molecule/protein-based therapeutics. Castanotto et al. (2009) *Nature* 457:426-433. Additionally, owing to their short serum half-life and poor cellular uptake, successful clinical application of siRNA requires appropriate chemical modifications and better delivery vehicles to overcome the numerous cellular barriers. Kim et al. On the other hand, small organic molecules can act as both antagonists and agonists for molecular targets and their drug effects can be much faster than siRNA with minimal problems during their intracellular uptake. Bumcrot et al. The present invention addresses the deficiencies of current genetic manipulation-based therapies.

SUMMARY OF THE INVENTION

The present invention, in one embodiment, provides non-cytotoxic co-delivery platforms capable of efficient translocation of nucleic acids and small molecules with specificity as well as cooperative therapeutic effects.

The present invention, in one embodiment, provides a drug delivery vehicle comprising one or more cyclodextrin moieties conjugated to a dendritic polyamine.

In another embodiment, the present invention provides a drug delivery vehicle comprising one or more cyclodextrin moieties conjugated to a dendritic polyamine and further comprising one or more therapeutic molecules. In one embodiment, the therapeutic molecule is a small molecule or protein therapeutic. In another embodiment, the therapeutic molecule is a nucleic acid. In another embodiment, the drug delivery vehicle comprises a small molecule or protein therapeutic and a nucleic acid therapeutic. In another embodiment, the delivery vehicle is conjugated to a targeting ligand.

In another embodiment, the present invention provides a method for making a drug delivery vehicle of the invention.

In another embodiment, the present invention provides compositions and kits comprising a drug delivery vehicle of the invention.

The present invention provides, in another embodiment, a method of delivering therapeutic agents to a cell.

DETAILED DESCRIPTION OF THE INVENTION

Figure 1:
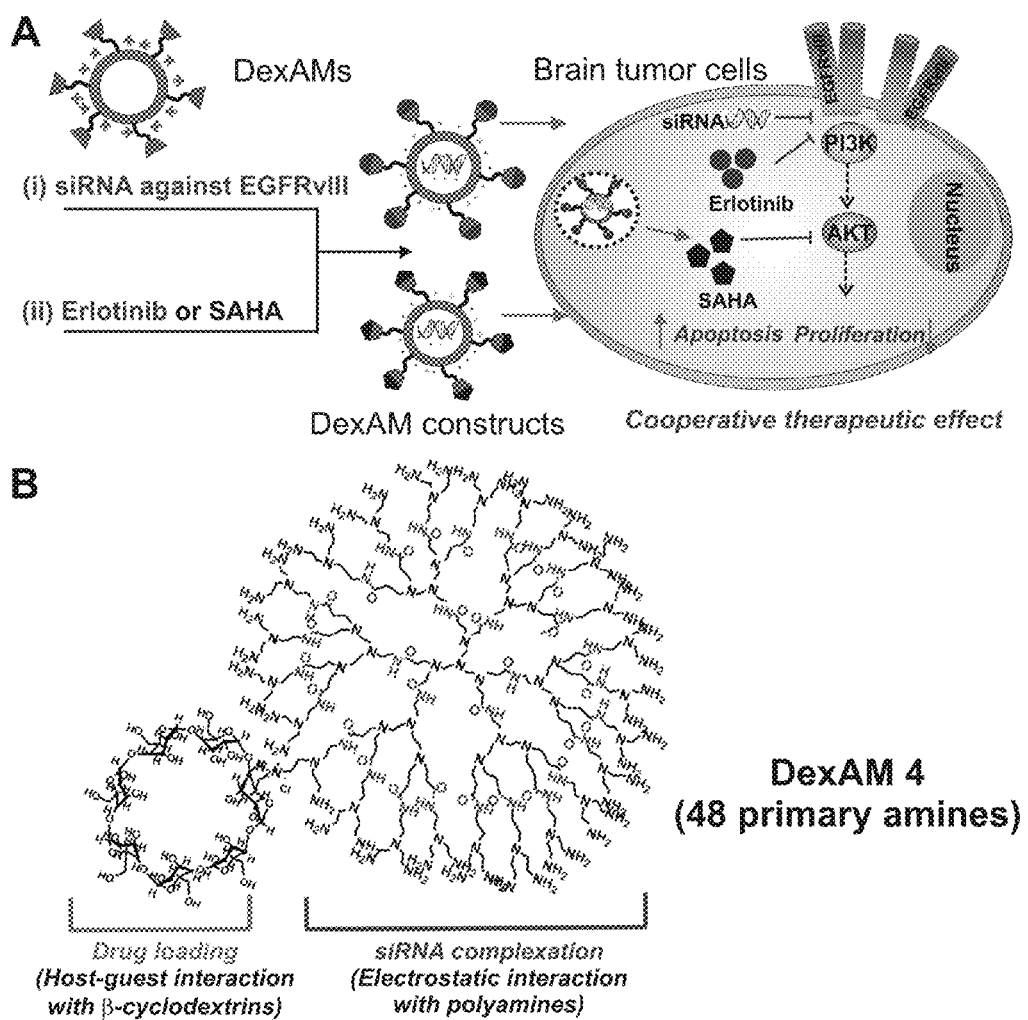
FIG. 1A depicts a scheme for co-delivery of small molecules such as anticancer drugs and siRNAs to cancer cells using cyclodextrin modified polyamines (DexAMs).
FIG. 1B depicts an example of a chemical structure of a delivery vehicle.

The present invention provides, in one embodiment, a multifunctional delivery vehicle comprising a dendritic polyamine backbone conjugated to one or more cyclodextrin (CD) moieties (referred to herein as DexAMs) and its application for target-specific co-delivery of orthogonal therapeutic molecules (nucleic acid and small molecule or protein). Additionally, optional conjugation of targeting ligands to the delivery vehicles allows for selective uptake of the complexes into target cells, thereby minimizing toxic side effects on normal cells.

The delivery vehicle and synthetic methods have several advantages, as compared to conventional carrier molecules (e.g. polyethyleneimine (PEI) and polyamidoamine (PAMAM). These include: (i) minimal cytotoxicity and high transfection efficiency of nucleic acid/small molecule drug-DexAM constructs, (ii) significantly higher yields and purity of DexAMs and increased aqueous solubility of DexAM constructs, and (iii) capability of simultaneously delivering nucleic acids, small organic molecules and proteins, thereby achieving cooperative therapeutic effects.

The drug delivery vehicle provided by one embodiment of the present invention comprise one or more cyclodextrin moieties conjugated to a dendritic polyamine.

Cyclodextrins are cyclic oligosaccharides with a hydrophilic outer surface and a lipophilic central cavity and consist of ($\alpha$-1,4)-linked $\alpha$-D-glucopyranose units. For a review, see Rasheed et al. (2008) Sci. Pharm. 76:567-598. The term cyclodextrin as used herein includes the naturally occurring $\alpha$-CD, $\beta$-CD and $\gamma$-CD as well as pharmaceutically acceptable derivatives such as hydroxylpropyl, methylated and sulfobutylether derivatives. In a preferred embodiment of the present invention, the cyclodextrin is $\beta$-CD. The cyclodextrins are capable of forming inclusion complexes with small molecule drugs and proteins by taking up the molecules into the lipophilic central cavity in a non-covalent interaction.

The dendritic polyamine component of the delivery vehicles of the present invention provides a positive surface charge which can interact electrostatically with negatively charged nucleic acids, condensing them into cationic complexes, or polyplexes, thereby facilitating intracellular uptake and endosomal escape. Since the primary/tertiary amines are also responsible for cytotoxicity, in accordance with the present invention the number of primary amines in the polyamine is optimized to achieve a balance between cytotoxocity and complexation ability. Thus in one embodiment of the present invention, the dendritic polyamine component of the delivery vehicle has at least 4 primary amine groups. In another embodiment of the present invention, the dendritic polyamine component of the delivery vehicle has at least 8 primary amine groups. In another embodiment of the present invention, the dendritic polyamine component of the delivery vehicle has at least 12 primary amine groups. In another embodiment of the present invention, the dendritic polyamine component of the delivery vehicle has at least 48 primary amine groups. In one preferred embodiment, the dendritic polyamine component of the delivery vehicle is a starburst dendrimer type polyamine backbone having at least 48 primary amines extending radially outward from a central core.

The drug delivery vehicles of the present invention may be synthesized by multistep solution-phase and solid-phase synthesis. For example, a first step for synthesizing a vehicle comprising a dendritic polyamine backbone conjugated to one or more cyclodextrin (CD) moieties (DexAM) comprises obtaining or generating a dendritic polyamine backbone. Such dendritic polyamines may be synthesized by Michael addition of a core initiator such as tris(2-aminoethyl)amine and methyl acrylate, followed by amidation of the amino esters generated after Michael addition. The use of tris(2-aminoethyl)amine as a core initiator results in higher surface amine groups and hence more compact dendrimers as compared to synthetic methods (for e.g. ethylenediamine, ammonia) for PAMAM dendrimers disclosed by Tomalia et al. (1985) Polymer J. 17:117-132. The cyclodextrin moiety is then conjugated to the polyamine backbone. For example, the conjugation of $\beta$-cyclodextrin to the polyamine backbone may comprise tosylation of $\beta$-cyclodextrin, followed by nucleophilic addition with amine group. Compared to the previously reported protocol of Tang et al. (2008) Nat. Prot. 3:691-697, where tosyl chloride was used for regioselective tosylation of $\beta$-cyclodextrin resulting in very low yields, the synthetic yield (~50%) and purity are improved by using tosylimidazole, instead of tosyl chloride, under reflux conditions to generate 6-mono-tosylated $\beta$-cyclodextrin. In the next step, the polyamine backbone may be conjugated to tosylated-CD via nucleophilic addition to generate cyclodextrin conjugated polyamines. Cyclodextrin conjugated polyamines produced by the foregoing method exhibit a 25-fold increase in the aqueous solubility of CD (>50 g/100 mL) as compared to that of CD alone (<1.8 g/100 mL).

In another embodiment, the present invention provides a drug delivery vehicle comprising one or more cyclodextrin moieties conjugated to a dendritic polyamine and further comprising one or more therapeutic molecules. In one embodiment, the therapeutic molecule is a small molecule or protein therapeutic. In another embodiment, the therapeutic molecule is a nucleic acid. In another embodiment, the drug delivery vehicle comprises a small molecule therapeutic and a nucleic acid. In another embodiment, the delivery vehicle is conjugated to a targeting ligand.

Small molecule and protein therapeutics include any small molecule, peptide and polypeptide agents that can form an inclusion complex with cyclodextrin and are useful in the treatment or prevention of a disease or disorder. Included for example are anticancer drugs, antineoplastic drugs, antifungal drugs, antibacterial drugs, antiviral drugs, cardiac drugs, neurological drugs, antibiotics, and bioactive peptides and polypeptides. The therapeutic molecule preferably contains a hydrophobic moiety or is modified to contain a hydrophobic moiety. In one preferred embodiment, the therapeutic molecule is a chemotherapeutic agent. In another preferred embodiment, the therapeutic molecule is a chemotherapeutic agent including for example erlotinib (Tarceva), suberoylanilide hydroxamic acid (SAHA) (vorinostat), taxol, doxorubicin, docetaxel, fulvestrant, paclitaxel, campothecin, and daunorubicin.

Noncovalent complexes of the small molecule or protein therapeutics with the delivery vehicles of the invention are formed by mixing the small molecule or protein therapeutics with the delivery vehicles in aqueous solution, resulting in inclusion of the small molecule or protein therapeutic into the CD moiety of the delivery vehicle.

Nucleic acid therapeutic molecules are known in the art and include, for example, short interfering RNA (siRNA), microRNA (miRNA), decoy oligonucleotides, aptamers, and antisense oligonucleotides. The nucleic acid molecules can be designed by methods well known in the art. For example, siRNA, miRNA, and antisense RNA molecules with homology sufficient to provide sequence specificity required to uniquely degrade any RNA can be designed using programs known in the art, including, but not limited to, those maintained on websites for AMBION, Inc. and DHARMACON, Inc. Systematic testing of several designed species for optimization of the siRNA, miRNA, and antisense RNA sequences can be routinely performed by those skilled in the art. Considerations when designing short interfering nucleic acid molecules include, but are not limited to, biophysical, thermodynamic, and structural considerations, base preferences at specific positions in the sense strand, and homology. These considerations are well-known in the art and provide guidelines for designing the above-mentioned nucleic acid molecules.

In one preferred embodiment, the nucleic acid therapeutic molecule is siRNA. In another preferred embodiment, the siRNA is directed against a biomarker for a target cell, for example a cell surface marker present on a cancer cell. For example, brain tumor cells present high levels of epidermal growth factor receptors (EGFRs) on their cell surfaces. In one preferred embodiment, the nucleic acid therapeutic molecule is siRNA against EGFR. In another preferred embodiment, the nucleic acid therapeutic molecule is siRNA against EGFR variant III (EGFRvIII).

The dendritic polyamine moiety of the delivery vehicles of the present invention provides a positive surface charge that interacts with the negatively charged nucleic acid therapeutic molecules to condense them into cationic complexes, or polyplexes. Noncovalent complexes of the nucleic acid therapeutic molecules with the delivery vehicles of the invention may be produced by mixing the components in aqueous solution. One of ordinary skill in the art can optimize the concentrations, or ratios of amines in the polyamine moiety to phosphate in the nucleic acid molecule, to achieve complexes with the desired hydrodynamic diameters. In a preferred embodiment, the diameter of the complex is less than 1000 nm. In another preferred embodiment, the diameter of the complex is from about 100 nm to about 500 nm, or from about 250 nm to about 400 nm. Methods for forming such complexes are known in the art and reviewed, for example, by Christie et al. (2010) $Endocrinology$ 151:466-473.

The delivery vehicles may comprises further components such as dyes, markers, and targeting agents. For example, the vehicles may contain a targeting agent that facilitates tissue-specific or cell-specific delivery of the therapeutic molecules. The targeting agent may be a binding partner for a cell-surface biomarker, such as an antibody directed against a molecule on the cell surface, or a natural or synthetic ligand that is selective for a particular cell type. In one preferred embodiment, the delivery vehicle may be conjugated to an antibody that targets a cell type, for example an antibody against EGFR. Components such as dyes, markers, and targeting agents may be conjugated directly or via a linker to the delivery vehicle by methods known in the art. In a preferred embodiment, such components are conjugated to the polyamine moiety of the delivery vehicle.

In another embodiment, the present invention provides compositions comprising a drug delivery vehicle of the invention. The compositions are useful in a method of delivering one or more therapeutic agents to a subject. In a preferred embodiment the subject is a mammal. In another preferred embodiment, the subject is a human.

The composition can be a pharmaceutical composition that contains a pharmaceutically acceptable carrier. The term "pharmaceutical composition" refers to the combination of an active agent with a carrier, inert or active, making the composition especially suitable for diagnostic or therapeutic use in vivo or ex vivo. A "pharmaceutically acceptable carrier," after administration to a subject, does not cause undesirable physiological effects. The carrier in the pharmaceutical composition must be acceptable also in the sense that it is compatible with the active ingredient and can be capable of stabilizing it. One or more solubilizing agents can be utilized as pharmaceutical carriers for delivery of an active agent. Examples of a pharmaceutically acceptable carrier include, but are not limited to, biocompatible vehicles, adjuvants, additives, and diluents to achieve a composition usable as a dosage form. Examples of other carriers include colloidal silicon oxide, magnesium stearate, cellulose, and sodium lauryl sulfate.

The above-described composition, in any of the forms described above, can be used for delivering one or more therapeutic molecules to a subject. An effective amount refers to the amount of an active compound/agent that is required to confer a therapeutic effect on a treated subject. Effective doses will vary, as recognized by those skilled in the art, depending on the types of conditions treated, route of administration, excipient usage, and the possibility of co-usage with other therapeutic treatment.

A pharmaceutical composition of this invention can be administered parenterally, orally, sublingually, nasally, rectally, topically, or buccally. The term "parenteral" as used herein refers to, but not limited to, subcutaneous, intracutaneous, intravenous, intramuscular, intraperitoneal, intrathecal, intratumor, intraocular, intraarticular, or intraarterial administration, as well as any suitable infusion technique. A sterile injectable composition can be a solution or suspension in a non-toxic parenterally acceptable diluent or solvent. Such solutions include, but are not limited to, 1,3-butanediol, mannitol, water, Ringer's solution, and isotonic sodium chloride solution. In addition, fixed oils are conventionally employed as a solvent or suspending medium (e.g., synthetic mono- or diglycerides). Fatty acid, such as, but not limited to, oleic acid and its glyceride derivatives, are useful in the preparation of injectables, as are natural pharmaceutically acceptable oils, such as, but not limited to, olive oil or castor oil, polyoxyethylated versions thereof. These oil solutions or suspensions also can contain a long chain alcohol diluent or dispersant such as, but not limited to, carboxymethyl cellulose, or similar dispersing agents. Other commonly used surfactants, such as, but not limited to, TWEENS or SPANS or other similar emulsifying agents or bioavailability enhancers, which are commonly used in the manufacture of pharmaceutically acceptable solid, liquid, or other dosage forms also can be used for the purpose of formulation.

In another embodiment, the present invention provides a method for delivering a small molecule or protein therapeutic and a nucleic acid therapeutic to a cell comprising contacting cell with a delivery vehicle of the present invention that comprises a small molecule or protein therapeutic and a nucleic acid therapeutic. In a preferred embodiment, the cell is a human cell. In another preferred embodiment, the cell is a cancer cell.

The present invention provides, in another embodiment, a method for delivering a small molecule or protein therapeutic and a nucleic acid therapeutic to a subject in need of such delivery comprising administering to the subject a delivery vehicle of the present invention that comprises a small molecule or protein therapeutic and a nucleic acid therapeutic. In a preferred embodiment, the subject is a mammal. In another preferred embodiment, the subject is a human. In another embodiment, the subject suffers from cancer. In another embodiment, the subject suffers from brain cancer, including for example glioblastoma.

In another embodiment, the present invention provides kits comprising a drug delivery vehicle of the invention. Such kits include at least a first compartment containing a composition comprising the delivery vehicles described above in a pharmaceutically acceptable carrier. The kits may additionally contain solutions or buffers for affecting the delivery of the first composition. The kits may further contain additional compositions which contain further therapeutic agents. The kits may further contain catheters, syringes or other delivering devices for the delivery of one or more of the compositions used in the methods of the invention. The kits may further contain instructions containing administration protocols for the therapeutic regimens.

All references cited herein are incorporated herein by reference in their entireties.

The following non-limiting examples serve to further illustrate the present invention.

EXAMPLE 1

Materials and Methods

β-cyclodextrin, tosylimidazole, di-tert-butyl dicarbonate, tris(aminoethyl)amine, methyl acrylate, 6,7-dimethoxyquinazolone, aniline, amberlite IRA 900 were obtained from Sigma-Aldrich and used as received unless otherwise noted. 6-hydrazinonicotinamide and 4-formylbenzamide were from SoluLinK. Other chemicals and solvents were of analytical reagent grade. All reactions were conducted in flame-dried glassware with magnetic stifling under an atmosphere of dry nitrogen. Reaction progress was monitored by analytical thin layer chromatography (TLC) using 250 μm silica gel plates (Dynamic Absorbents F-254). Visualization was accomplished with UV light and potassium permanganate stain, followed by heating. Proton nuclear magnetic resonance ($^1$H NMR) spectra were recorded on either a Varian-300 instrument (300 MHz), Varian-400 instrument (400 MHz) or a Varian-500 instrument (500 MHz). Chemical shifts of the compounds are reported in ppm relative to tetramethylsilane (TMS) as the internal standard. Data are reported as follows: chemical shift, integration, multiplicity (s=singlet, d=doublet, t=triplet, q=quartet, br=broad, m=multiplet), and coupling constants (Hz).

Quantification of siRNA Loading Efficiency

The complexes were prepared at various charge ratios by mixing equal volumes of DexAM with siRNA in PBS. Charge ratios (N/P) were calculated as a ratio of the number of primary amines in the polymer, determined from 1H NMR spectra, to the number of anionic phosphate groups in the siRNA. The samples were then incubated at room temperature for 30 minutes to ensure complex formation. The complexes were prepared at a final siRNA concentration of 0.2 μg of siRNA/100 μL of solution. 100 μL of each complex were transferred to a 96-well (black-walled, clear-bottom, non-adsorbing) plate (Corning, N.Y., USA). A total of 100 μL of diluted PicoGreen dye (1:200 dilution in Tris-EDTA (TE) buffer) was added to each sample. Fluorescence measurements were made after 10 minutes of incubation at room temperature using a M200 Pro Multimode Detector (Tecan USA Inc, NC, USA), at excitation and emission wavelengths of 485 and 535 nm, respectively. All measurements were corrected for background fluorescence from a solution containing only buffer and PicoGreen dye.

Particle Size and Zeta Potential Analysis

Dynamic light scattering (DLS) and Zeta Potential analyses were performed using a Malvern Instruments Zetasizer Nano ZS-90 instrument (Southboro, Mass.) with reproducibility being verified by collection and comparison of sequential measurements. Polymer/siRNA complexes (siRNA concentration=330 nM) at different polymer concentrations, were prepared using purified water (resistivity=18.5 MΩ-cm). DLS measurements were performed at a 90° scattering angle at 25° C. Z-average sizes of three sequential measurements were collected and analyzed. Zeta potential measurements were collected at 25° C., and the Z-average potentials following three sequential measurements were collected and analyzed.

Cell Culture

Cells were cultured in the following growth media: DMEM (Dulbecco's modified Eagle's medium) with high glucose (Invitrogen), 10% Fetal Bovine Serum (FBS), 1% streptomycin-penicillin, 1% glutamax (Invitrogen), and selection markers, G418 (100 μg/ml) and hygromycin B (30 μg/ml) for U87-EGFP and U87-EGFRvIII respectively. PC-12 cells were cultured in DMEM with 10% horse serum, 5% FBS and 1% Streptomycin-penicillin. For the knockdown experiment and targeted delivery, passaged cells were prepared to 40-60% confluency in 24-well plates. For the knockdown experiment, targeted delivery and cell viability assay, media was exchanged with serum-free basal media (500 μl) and siRNA-DexAM solution (50 μl) was added after 20-30 minutes. After incubation for 12 hours, media was exchanged with normal media. Fluorescence measurement and cellular assays were performed after 48-96 hours from the starting point.

Cytotoxicity Assays

The percentage of viable cells was determined by MTS assay following standard protocols described by the manufacturer. All experiments were conducted in triplicate and averaged. The quantification of polymer-mediated toxicity was done using MTS assay after incubating the glioblastoma cells in the presence of varying concentrations of only polymer vehicle for 48-96 h. The data is represented as formazan absorbance at 490 nm, considering the control (untreated) cells as 100% viable.

Quantification of Knockdown of EGFP Expression (Image J)

Following siRNA treatment, cells were washed with DPBS and fixed with 2-4% paraformaldehyde solution prior to imaging. For the fluorescence, DIC, and phase contrast images were obtained using the Zeiss Axio observer inverted epifluorescence microscope. Each image was captured with different channels and focus. Images were processed and overlapped using Image-Pro (Media Cybernetics) and ImageJ (NIH).

Targeted Delivery

Highly tumorigenic U87-EGFP cells and low-tumorigenic PC-12 cells were cultured in 24-well plates, at a density of $5 \times 10^4$ cells per well. For PC-12 cells, the normal growth media was DMEM (with high glucose, Invitrogen), 5% horse serum, 10% FBS, 1% Glutamax, and 1% penicillin-streptomycin. For the delivery of EGFR-Ab conjugated DexAM polyplexes, media was exchanged with serum free DMEM media. The cells were incubated in the Ab-conjugated polyplex medium for 6-8 h. Fluorescence images were taken after replacing the serum-free media with regular media.

Apoptosis Assay

Cells were harvested by trypsinization and stained using an Annexin V FITC Apoptosis Detection kit (Roche, Cambridge, Mass.) according to the manufacturer's protocol. The stained cells were immediately analyzed by flow cytometry (FACScan; Becton Dickinson, Franklin Lake, N.J.). Early apoptotic cells with exposed phosphatidylserine but intact cell membranes bound to Annexin V-FITC but excluded propidium iodide. Cells in necrotic or late apoptotic stages were labeled with both Annexin V-FITC and propidium iodide.

EXAMPLE 2

Synthesis of DexAM 1

Figure 3:
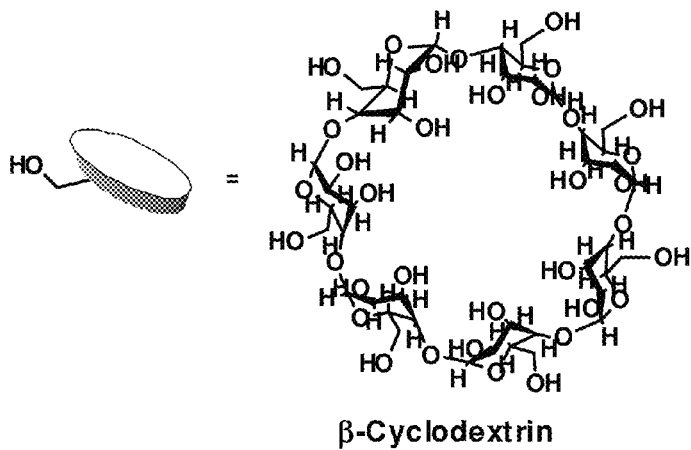
FIG. 3 depicts a scheme for the synthesis of DexAM 1. a) ddH$_2$O, RT, 4 h/1% NaOH, 10 min/NH$_4$Cl, b) AcOH, EtOH, RT, 12 h, c) DIEA, DCM; d) DMF, RT, 2 h, e) DCC, DMAP, DCM, 0° C., 30 min/DMF, RT, 10 h, f) Di-tert-butyl dicarbonate, DIEA, DCM, RT, 24 h, g) CF$_3$CH$_2$OH, DCM; h) DCC, DMAP, DMSO, 0° C., 30 min/RT, 24 h, i) DMF, 90° C., 48 h, j) TFA:DCM (50:50 v/v); k) Amberlite IRA 900.
Figure 3:
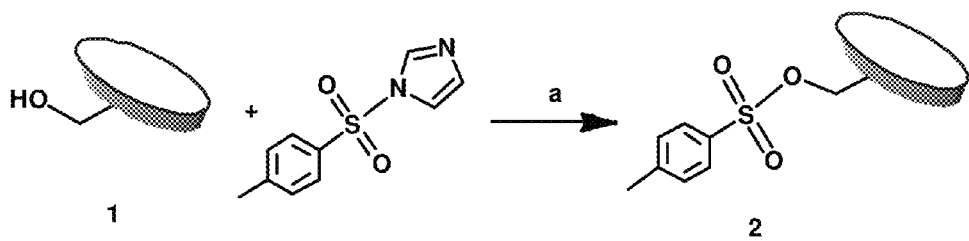
Figure 3:
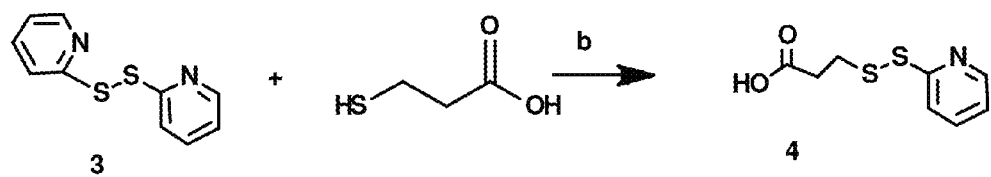
Figure 3:
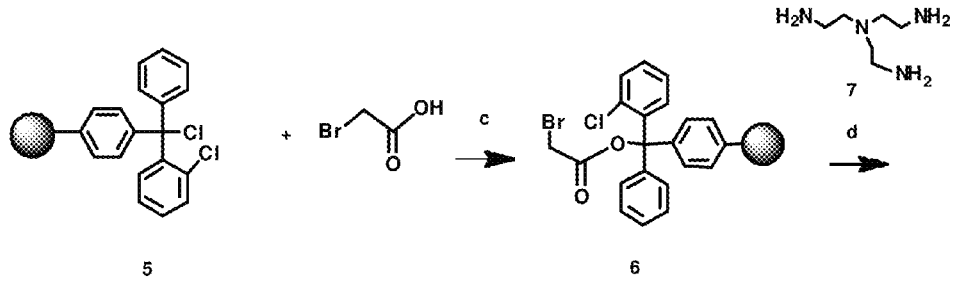
Figure 3:
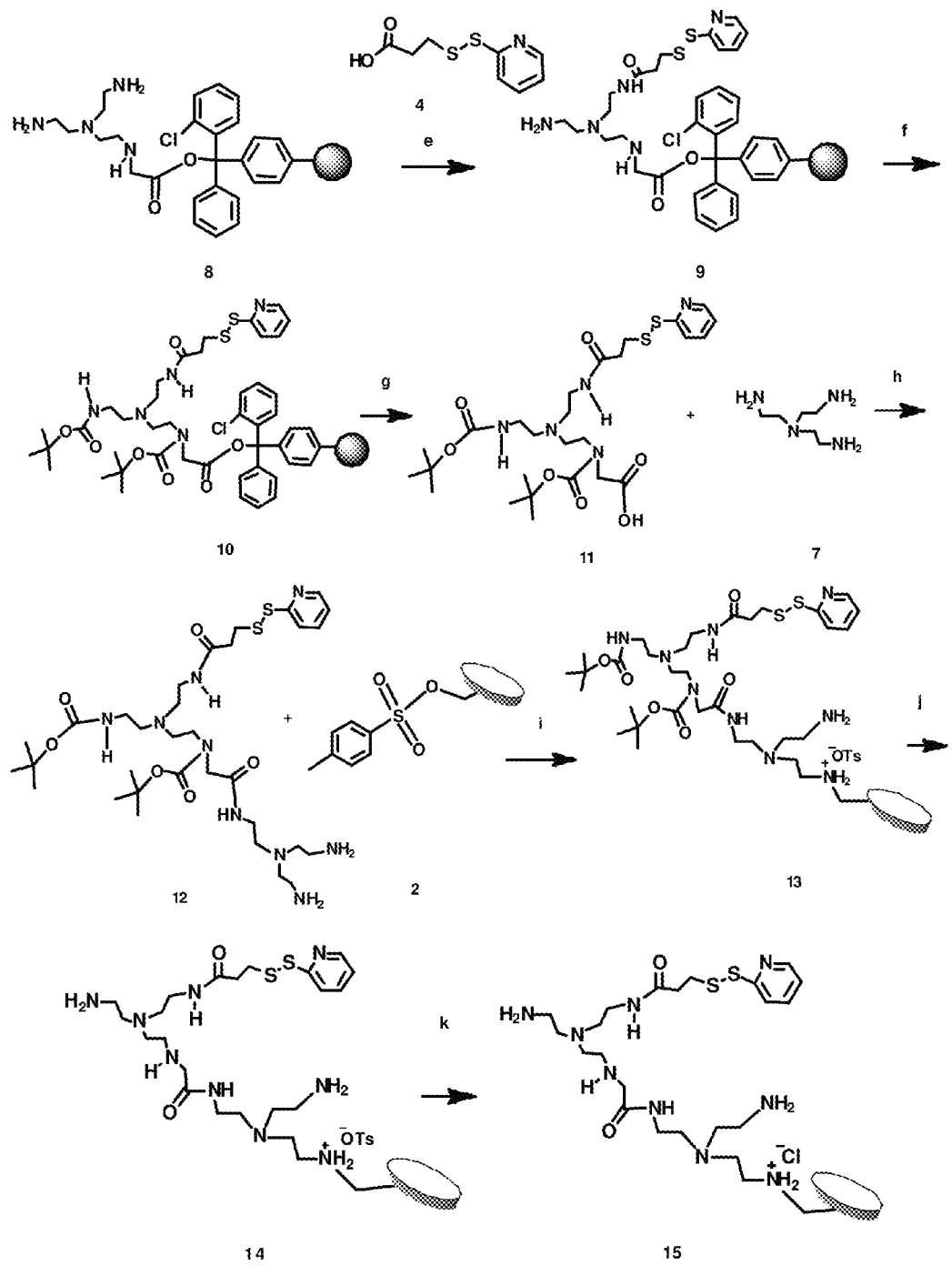

The scheme for the synthesis of DexAM 1 is depicted in FIG. 3.

1.1 Synthesis of Mono-Tosylated Cyclodextrin (2)

β-cyclodextrin (8.75 g, 7.71 mmol) and tosylimidazole (2.22 g, 10.0 mmol) was dissolved in 88 ml deionized water. The solution was vigorously stirred for 4 h at room temperature. Aqueous NaOH solution (1% (w/v), 10.0 ml) was gradually added to the solution and stirred for an additional 10 min. The insoluble solid was filtered off and the filtrate was collected. The filtrate was neutralized to pH 7 using $NH_4Cl$ to induce precipitation. The precipitate was then collected by filtration, washed with cold water (25 ml 3) and with acetone (25 ml 4). The solid was dried in a drying oven at 60° C. under vacuum (10 mm Hg) overnight to yield 2 as a white solid (4.5 g, 51% yield). $^1$H NMR (300 MHz, DMSO-d6), δ 7.72 (d, J=8.4 Hz, 2H), 7.41 (d, J=8.4 Hz, 2H), 5.60-5.89 (m, 14H), 4.75-4.81 (m, 7H), 4.15-4.62 (m, 6H), 3.45-3.72 (m, 28H), 3.15-3.47 (m, 24H), 2.41 (s, 3H). MS (m/z): calculated, 1,288.4 for $C_{49}H_{76}O_{37}S$; found, 1,311.5 for [M+Na]+.

1.2 Synthesis of 2-pyridyl-2-carboxyethyl disulfide (4)

2,2'-Bipyridyl disulfide (3, 1 g, 4.54 mmol) was dissolved in 15 mL of ethanol (99.5%) followed by addition of 0.4 mL of glacial acetic acid. The solution was vigorously stirred and 0.24 g (2.27 mmol) of 3-mercaptopropionic acid in 5 mL of ethanol was added dropwise. The reaction mixture was stirred at room temperature for 12 h. The excess solvent was then removed under reduced pressure. The resulting oily product mixture was dissolved in 3 mL of hexane/ether (80:20, v/v %). The product was purified by column chromatography using silica gel. The pyridine-2-thione eluted as a yellow band. The desired product (4,2-pyridyl-2-carboxyethyl disulfide) was collected, and the solvent was removed by evaporation. The residual acetic acid was removed under high vacuum. Isolated yield=0.4 g (82.2%, based on 0.24 g of the 3-mercaptopropionic acid starting material). $^1$H NMR (300 MHz, $CDCl_3$), δ 2.68-2.73 (t, J=7.20 Hz, 2H), 3.02-3.06 (t, J=6.90 Hz, 2H), 7.20-7.25 (t, J=5.0 Hz, 1H), 7.78-7.87 (t, J=7.2 Hz, 2H), 8.39-8.41 (d, J=4.8 Hz, 1H). MS (m/z): calculated, 215.01 for $C_8H_9NO_2S_2$; found, 238.28 for [M+Na]+.

1.3 Anchorage of the Acidic Function to the Polymeric Support

Briefly, o-chlorotrityl chloride resin (5, 5 g, 1.2 mmol of Cl/g of resin from Fisher Chemicals) was placed in the solid-phase synthesis vessel (100 mL) and 50 mL of $CH_2Cl_2$ was added, followed by bromoacetic acid (1.05 g, 7 mmol) and DIEA (0.95 ml, 7.5 mmol). The flask was shaken on a horizontal gyrorotatory shaker for 3 h at room temperature. The solution was filtered and the functionalized resin beads (6) were washed three times with $CH_2Cl_2$, iPrOH and MeOH followed by drying under a stream of nitrogen.

1.4 Reaction of the Polyamine with the Bromoacetyl Resins (8)

Tris(2-aminoethyl)amine (7.10-fold molar excess) were dissolved in 50 mL of DMF, added to the vessel containing the functionalized resin beads (6) and shaken for 2 h. The reaction was monitored using the ninhydrin test. The product (8) was filtered, washed with $CH_2Cl_2$ and iPrOH (20 mL each) and then finally washed with $CH_2Cl_2$.

1.5 Attachment of a Disulfide Linker to the Polyamine on the Resin (9)

To a suspension of pyridyl-2-carboxyethyl disulfide (4, 645.87 mg, 3.00 mmol) in $CH_2Cl_2$ (15 mL), DCC (928.485 mg, 4.50 mmol, 1.5 eq) and dimethylamino pyridine (36.65 mg, 0.3 mmol, 0.1 eq) were added at 0° C. and stirred at the same temperature for 30 min. This mixture was added to the vessel containing 8 and shaken for 10 h at room temperature.

1.6 Protection of the Amine Groups of the Functionalized Polyamine on the Solid Support (10)

Di-tert-butyl dicarbonate (5.51 mL, 24 mmol) and DIEA (4.35 mL, 25 mmol) were dissolved in $CH_2Cl_2$ (15 mL) and added to 9; the reaction was left overnight at room temperature under shaking. The product (10) was filtered, washed with $CH_2Cl_2$, iPrOH and MeOH and finally dried under a stream of nitrogen. The protection of the amine groups was confirmed using the ninhydrin test, which was found to be negative.

1.7 Synthesis of 11-(tert-butoxycarbonyl)-2,2-dimethyl-4-oxo-8-(2-(3-(pyridin-2-yldisulfanyl) propanamido)ethyl)-3-oxa-5,8,11-triazamidecan-13-oic acid (11)

The Boc-protected resin (10) was placed in a 100 mL solid phase vessel. A solution containing 25 mL of dichloromethane and 25 mL of CF$_3$COOH was added to it and shaken for 2 h at room temperature. The solution was filtered and the resin washed with 100 mL of CH$_2$Cl$_2$. The organic fractions were collected and the solvent evaporated. The crude products were purified by flash chromatography on SiO$_2$. The fractions containing the products were identified by TLC and characterized using mass spectroscopy and NMR. TLC(CH$_2$Cl$_2$:MeOH, 90:10 v/v): Rf=0.65; $^1$H NMR (400 MHz, DMSO-d$_6$) δ 1.3 (s, 18H), 2.32 (m, J=6.5 Hz, 8H), 2.66 (t, J=7 Hz, 2H), 3.46 (m, J=7 Hz, 4H), 3.74 (t, 2H), 4.3 (s, 2H), 7.10-7.20 (t, J=5.0 Hz, 1H), 7.26(t, J=5.0 Hz, 1H), 7.60-7.68 (t, J=7.2 Hz, 2H), 8.44-8.56 (d, J=4.8 Hz, 1H). MS (m/z): calculated, 601.26 for C$_{26}$H$_{43}$N$_5$O$_7$S$_2$; found, 624.77 for [M+Na]+.

1.8 DCC Coupling

To 11 (601.78 mg, 1.00 mmol) in DMSO (10 mL), DCC (309.495 mg, 1.50 mmol, 1.5 eq) and DMAP (0.1 eq, 12.22 mg) were added at 0° C. and stirred for 30 mins. Tris-(aminoethyl)amine (7) was added dropwise to the solution and stirred for 30 mins. The mixture was then allowed to stir for 24 h at room temperature. DMSO was then removed under reduced pressure. The product (12) was purified by column chromatography using silica gel. Yield: 80%; TLC (CHCl$_3$: MeOH, 90:10 v/v): Rf=0.4; $^1$H NMR (400 MHz, DMSO-d$_6$ δ 1.0-1.4 (m, 4H), 1.5 (s, 18H), 1.8 (m, J=6.5 Hz, 14H), 2.00 (m, J=7 Hz, 8H), 3.5 (m, J=7 Hz, 6H), 4.0 (s, 2H), 7.10-7.20 (t, J=5.0 Hz, 1H), 7.26(t, J=5.0 Hz, 1H), 7.60-7.68 (t, J=7.2 Hz, 2H), 8.44-8.56 (d, J=4.8 Hz, 1H). MS (m/z): calculated, 729.40 for C$_{32}$H$_{59}$N$_9$O$_6$S$_2$; found, 752.99 for [M+Na]+.

1.9 Synthesis of Water-Soluble CD Polyamine (13)

Tosylated CD (2, 1.29 g, 1 mmol) and the Boc-protected polyamine (12, 730 mg, 1 mmol) were dissolved in DMF (10 mL) in a 25-mL one-necked round-bottomed flask, equipped with a Liebig's condenser and a stir bar. The flask was degassed and purged with nitrogen. The mixture was stirred and refluxed at 90° C. for 48 h. The reaction mixture was cooled down to room temperature and the product was precipitated out by the addition of acetone (20 ml). The precipitate was collected by filtration, washed with acetone and dried overnight at 60° C. in a vacuum oven (10 mm Hg) to yield 13 as a brown solid (1.3 g, 91% yield). $^1$H NMR (400 MHz, DMSO-d$_6$ δ 1.0-1.4 (m, 4H), 1.5 (s, 18H), 1.8 (m, J=6.5 Hz, 14H), 2.00 (m, J=7 Hz, 8H), 3.15-3.47 (m, 24H), 3.45-3.72 (m, 28H), 3.5 (m, J=7 Hz, 6H), 4.0 (s, 2H), 4.15-4.62 (m, 6H), 4.75-4.81 (m, 7H), 5.60-5.89 (m, 14H), 7.10-7.20 (t, J=5.0 Hz, 1H), 7.26(t, J=5.0 Hz, 1H), 7.2 (d, J=8.4, 2H), 7.5 (d, J=8.4, 2H), 7.60-7.68 (t, J=7.2 Hz, 2H), 8.44-8.56 (d, J=4.8 Hz, 1H).

1.10 Deprotection of N-Boc Amines by TFA (14)

The Boc-protected products (13) were deprotected using trifluoroacetic acid:DCM (1:1) for 1 h. The solvent was evaporated and the solid washed with acetone. The solid was dried overnight at 60° C. in a vacuum oven (10 mm Hg) to yield 14 as a brown solid (1.2 g, 95% yield). $^1$H NMR (400 MHz, DMSO-d$_6$ δ 1.0-1.4 (m, 4H), 1.8 (m, J=6.5 Hz, 14H), 2.00 (m, J=7 Hz, 8H), 3.15-3.47 (m, 24H), 3.45-3.72 (m, 28H), 3.5 (m, J=7 Hz, 6H), 4.0 (s, 2H), 4.15-4.62 (m, 6H), 4.75-4.81 (m, 7H), 5.60-5.89 (m, 14H), 7.10-7.20 (t, J=5.0 Hz, 1H), 7.26(t, J=5.0 Hz, 1H), 7.2 (d, J=8.4, 2H), 7.5 (d, J=8.4, 2H), 7.60-7.68 (t, J=7.2 Hz, 2H), 8.44-8.56 (d, J=4.8 Hz, 1H). MH+ 1819.94.

1.11 Anion Exchange Reaction (15)

CD Polyamine tosylate (14, 1.4 g, 1 mmol) was dissolved in 40 mL deionized water. A 50 mL solid-phase synthesis vessel was packed with Amberlite IRA-900 ion-exchange resin to about half the vessel volume. The solution was transferred into the solid phase vessel. After 1 h, the eluent was collected and the water distilled off under reduced pressure using a vacuum pump. The solid residue was dried overnight at 60° C. in a vacuum oven (10 mm Hg) to yield 15 as a brown solid. Yield: (1.15 g, 95% yield); $^1$H NMR (400 MHz, DMSO-d$_6$) δ 1.0-1.4 (m, 4H), 1.8 (m, J=6.5 Hz, 14H), 2.00 (m, J=7 Hz, 8H), 3.15-3.47 (m, 24H), 3.45-3.72 (m, 28H), 3.5 (m, J=7 Hz, 6H), 4.0 (s, 2H), 4.15-4.62 (m, 6H), 4.75-4.81 (m, 7H), 5.60-5.89 (m, 14H), 7.10-7.20 (t, J=5.0 Hz, 1H), 7.26(t, J=5.0 Hz, 1H), 7.60-7.68 (t, J=7.2 Hz, 2H), 8.44-8.56 (d, J=4.8 Hz, 1H). MH+ 1684.20.

EXAMPLE 3

Synthesis of DexAM 2

Figure 4:
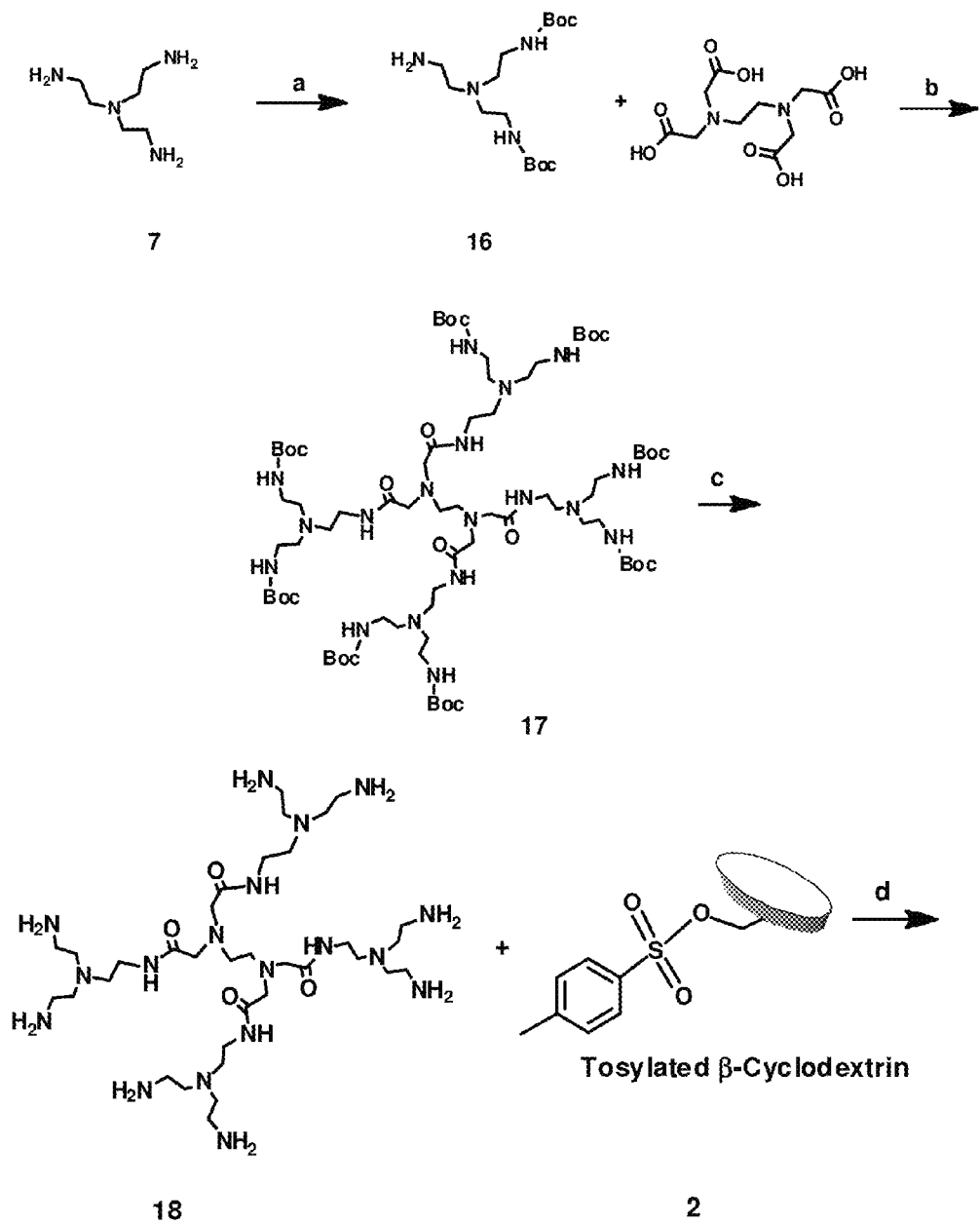
FIG. 4 depicts a scheme for the synthesis of DexAM 2. a) DCC, DMAP, DCM, MeOH, b) DCC, DMAP, DCM, MeOH, c) TFA:DCM (50:50 v/v), d) DMF, 90° C., 48 h, e) DMSO, RT, 24 h, f) Amberlite IRA900
Figure 4:
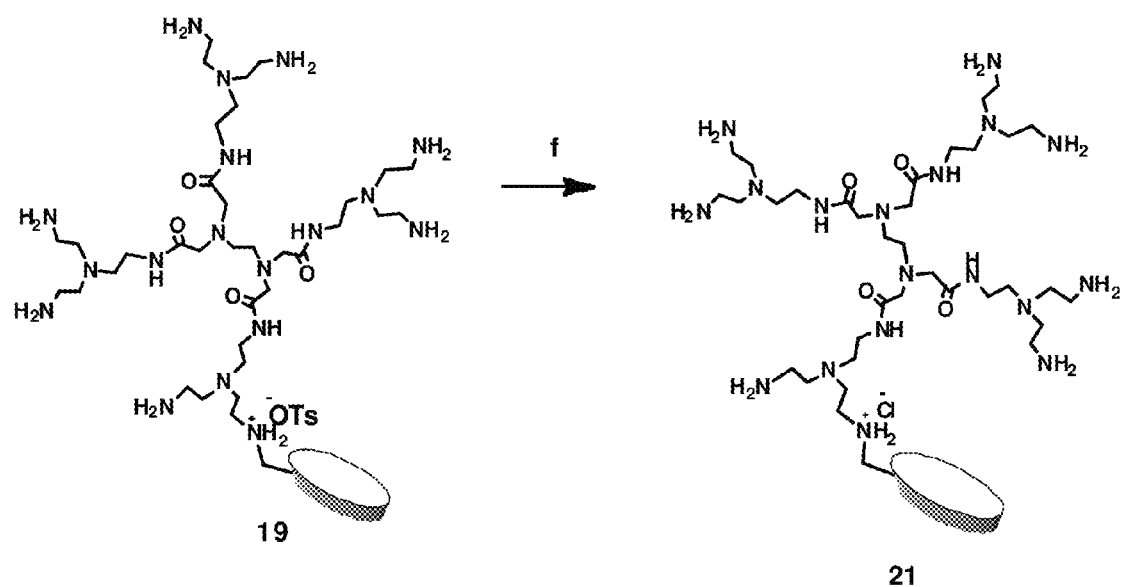

The scheme for the synthesis of DexAM 2 is depicted in FIG. 4.

2.1 Bis-[2-(tert-butoxycarbonylamino)ethyl]-(2-aminoethyl)amine (16)

Tris(2-aminoethyl)amine (7, 14.6 g, 100 mmol) was dissolved in 40 mL of dry CH$_2$Cl$_2$ and cooled to 0° C. A solution of di-tert-butyl dicarbonate (44.11 mL, 200 mmol) in 50 mL dry CH$_2$Cl$_2$ was added dropwise over 1 h. The mixture was stirred at room temperature for 24 h. After removal of the solvent under reduced pressure, the remaining yellow oil was dissolved in ethyl acetate and washed twice with 0.5 N NaOH. The aqueous phase was diluted with brine and re-extracted with ethyl acetate. The combined organic phases were dried over MgSO$_4$ and the solvent removed under reduced pressure. The crude products were purified by flash chromatography on SiO$_2$. The fractions containing the desired product were identified by TLC and characterized by mass spectroscopy and NMR. The product (16) was isolated as a pale-yellow oil. Yield: (18.02 g, 52%); TLC(CH$_2$Cl$_2$: MeOH, 90:10 v/v): Rf=0.65; $^1$H-NMR (DMSO-d$_6$) δ 1.37 (s, 18H), 2.38-2.44 (m, 6 H), 2.49-2.54 (m, 2 H), 2.95 (d, 4 H), 5.30 (s, 2 H). MS (m/z): calculated, 346.26 for C$_{16}$H$_{34}$N$_4$O$_4$; found, 369.46 for [M+Na]+.

2.2 Synthesis of 4-Armed Boc-Protected Amines

To EDTA (2.93 g, 10.0 mmol) in CH$_2$Cl$_2$ (45 ml), DCC (9.9 g, 48 mmol, 4.8 eq) and DMAP (0.4 eq, 489.0 mg, 4 mmol) were added at 0° C. and allowed to stir for 1 h. This solution was then added to 16 in MeOH (15 ml) and stirred for 24 h at room temperature. Yield: (12.85 g, 60%); TLC(CH$_2$Cl$_2$/MeOH, 90:10 v/v): Rf=0.4; $^1$H NMR (DMSO-d6, 400 MHz): δ 1.37 (s, 18 H), 1.00-1.49 (m, 16H), 1.8 (s, 4H), 2.40-2.85 (m, 40H), 3.00 (s, 8H), 3.45-3.55 (m, 8H), 8.20 (s, 4H). MS (m/z): calculated, 1605.08 for C$_{74}$H$_{144}$N$_{18}$O$_{20}$; found, 1629.03 for [M+Na]+.

2.3 Deprotection of N-Boc Amines by TFA to Obtain Polyamine of DexAM 2 (18)

To 4 arm-boc-protected amines (17, 1.6 g, 1 mmol) was added 40% TFA in dichloromethane (10 ml). After 3 h, the reaction mixture was concentrated to give 18 as clear oil. The solvent was evaporated and the crude products were purified by flash chromatography on SiO$_2$ to obtain 18. Yield: (772.92 mg, 96%); TLC(CH$_2$Cl$_2$/MeOH, 9:1): Rf=0.1; $^1$H NMR (DMSO-d6, 400 MHz): δ 1.00-1.49 (m, 16H), 1.8 (s, 4H), 2.40-2.85 (m, 40H), 3.00 (s, 8H), 3.45-3.55 (m, 8H), 8.20 (s, 4H). MS (m/z): calculated, 804.66 for C$_{34}$H$_{80}$N$_{18}$O$_4$; found, 828.11 for [M+Na]+.

2.4 Synthesis of Water-Soluble CD-Polyamine Tosylate (19)

Tosylated cyclodextrin (2, 2.58 g, 2 mmol) and amine (18, 1.61 g, 2 mmol) was dissolved in DMF (10 mL) in a 25-ml one-necked round-bottomed flask equipped with Liebig's condenser and a stir bar. The flask was degassed and purged with nitrogen. The mixture was stirred and refluxed at 90° C. for 48 h. The reaction mixture was cooled down to room temperature and the product precipitated out by the addition of acetone (20 ml). The precipitate was collected by filtration, washed with acetone and dried overnight at 60° C. in a vacuum oven (10 mm Hg) to yield 19 as a brown solid. Yield: (3.77 g, 90%); $^1$H NMR (DMSO-d6, 400 MHz): δ 1.00-1.49 (m, 16H), 1.8 (s, 4H), 2.40-2.85 (m, 40H), 2.41 (s, 3H), 3.00 (s, 8H), 3.15-3.47 (m, 24H), 3.45-3.55 (m, 8H), 3.45-3.72 (m, 28H), 4.15-4.62 (m, 6H), 4.75-4.81 (m, 7H), 5.60-5.89 (m, 14H), 7.2 (d, J=8.4 Hz, 2H), 7.5 (d, J=8.4 Hz, 2H), 8.0 (s, 4H). MH+ 2095.29.

2.5 Anion Exchange Reaction for Obtaining DexAM 2 (20)

CD-polyamine tosylate (19, 2.2 g, 1 mmol) was dissolved in 40 mL deionized water. A 50 mL solid-phase synthesis vessel was packed with Amberlite IRA-900 ion-exchange resin to about half the vessel volume. The solution was transferred into the solid phase vessel. After 1 h, the eluent was collected and the water was distilled off under reduced pressure using a vacuum pump. The solid residue was dried overnight at 60° C. in a vacuum oven (10 mm Hg) to yield 20 as a brown solid. Yield: (2.05 g, 95%); $^1$H NMR (DMSO-d$_6$, 400 MHz): δ 1.00-1.49 (m, 16H), 1.8 (s, 4H), 2.40-2.85 (m, 40H), 2.41 (s, 3H), 3.00 (s, 8H), 3.15-3.47 (m, 24H), 3.45-3.55 (m, 8H), 3.45-3.72 (m, 28H), 4.15-4.62 (m, 6H), 4.75-4.81 (m, 7H), 5.60-5.89 (m, 14H), 7.10-7.20 (t, J=5.0 Hz, 1H), 7.26(t, J=5.0 Hz, 1H), 7.60-7.68 (t, J=7.2 Hz, 2H), 8.2 (s, 4H), 8.44-8.56 (d, J=4.8 Hz, 1H). MH+ 2156.82.

EXAMPLE 4

Synthesis of DexAM 3 and its Conjugation to Alexa 594 Dye

Figure 5:
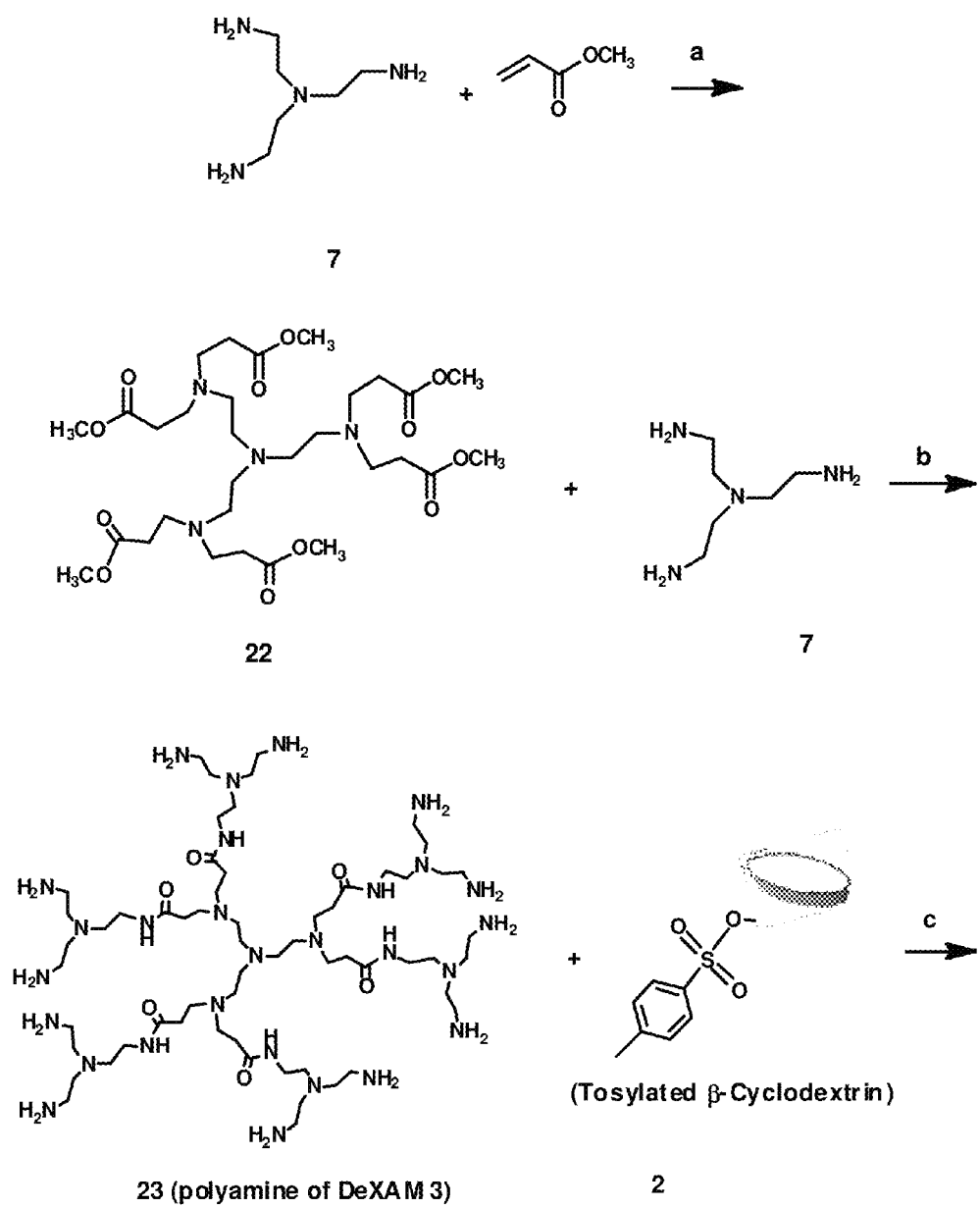
FIG. 5 depicts a scheme for the synthesis of DexAM 3 and its conjugation to Alexa 594 dye. a) MeOH, 0° C., 1 h/RT, 48 h, b) MeOH, 0° C., 1 h, RT, 7 days, c) DMF, 90° C., 48 h, d) Amberlite IRA900.
Figure 5:
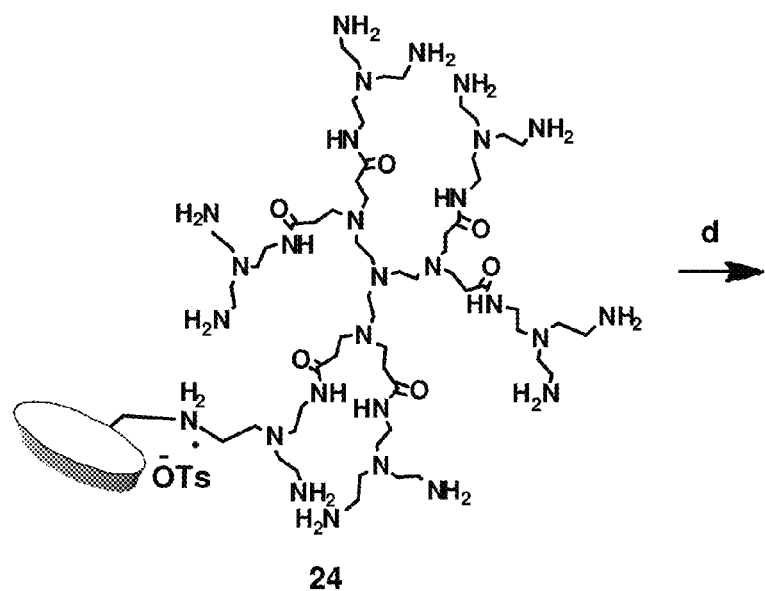
Figure 5:
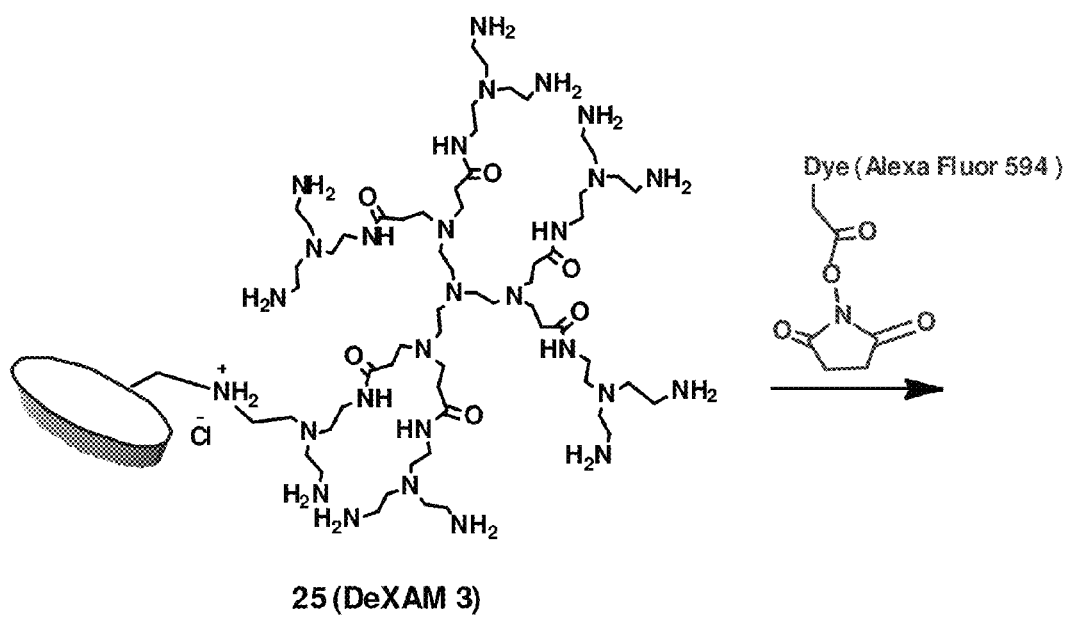
Figure 5:
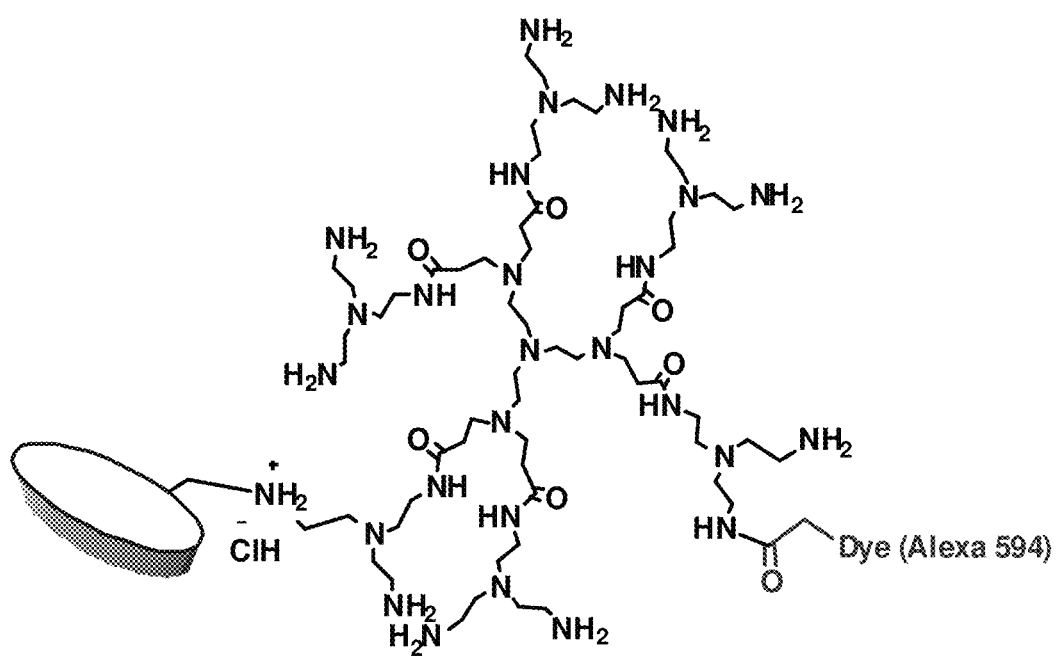

The scheme for the synthesis of DexAM 3 is depicted in FIG. 5.

3.1 Synthesis of hexamethyl-3,3',3",3"',3"",3""'-(2,2', 2"-nitrilotris(ethane-2,1-diyl)tris(azanetriyl)) hexapropanoate (22)

A solution of tris(aminoethyl)amine (7, 4.3872 g, 30 mmol) in methanol (25 mL) was added dropwise to a stirred solution of methyl acrylate (19.37 g, 225 mmol) in methanol (25 mL) for 1 h in an ice-water bath. The resulting solution was stirred for 1 h in an ice-water bath and then allowed to warm to room temperature and stirred for further 48 h. The solvent and excess acrylate were removed under reduced pressure using a rotary evaporator. The residue was purified by column chromatography to afford the product (22) as a colorless oil. Yield: 16.88 g, 85%); NMR (300 MHz, CDCl$_3$): δ 2.44 (t, J=6.9 Hz, 12H), 2.49 (s, J=6 Hz, 12H), 2.74 (t, J=6.9 Hz, 12H), 3.67 (s, 18H). MS (m/z): calculated, 662.37 for C$_{30}$H$_{54}$N$_4$O$_{12}$; found, 685.76 for [M+Na]+.

3.2 3,3',3",3"',3"",3""'-(2,2',2"-nitrilotris(ethane-2,1-diyl)tris(azanetriyl))hexakis(N-(2-(bis(2-aminoethyl) amino)ethyl)propanamide) (23)

A solution of 22 (2.17 g, 3.3 mmol) in methanol (20 mL) was added dropwise to solution of tris(aminoethyl)amine (7, 5.8 g, 39.6 mol) in methanol (20 mL) and stirred over a period of 1 h in an ice bath. The resulting solution was allowed to warm to room temperature and stirred for 7 days at room temperature at which time no methyl ester was detectable by NMR spectroscopy. The solvent was removed under reduced pressure using a rotary evaporator and then the excess tris (aminoethyl)amine was removed using an azeotropic mixture of toluene and methanol (90:10 v/v). The remaining toluene was removed by azeotropic distillation using methanol. Finally, the remaining methanol was removed under vacuum. The residue was purified by dialysis and centrifugal filtration to afford the desired product. Finally the product was kept under vacuum to obtain the amino-terminated product (23, 4.4 g, 99%) as colorless oil. NMR (300 MHz, CDCl$_3$): δ 1.25 (s, J=6.0 Hz, 24H), 2.44 (t, J=6.9 Hz, 12H), 2.48 (m, J=8 Hz, 72H), 2.74 (t, J=6.9 Hz, 12H), 3.25 (t, 12H), 8.0 (s, 6H). MS (m/z): calculated, 1347.14 for C$_{60}$H$_{138}$N$_{28}$O$_6$; found, 1370.0391 for [M+Na]+.

3.3 Synthesis of Water-Soluble CD-Polyamine Tosylate (24)

Tosylated cyclodextrin (2, 2.58 g, 2 mmol) and the polyamine (23, 2.694 g, 2 mmol) were dissolved in DMF (10 mL) in a 25 mL one-necked round-bottomed flask equipped with Liebig's condenser and a stir bar. The flask was degassed and purged with nitrogen. The mixture was stirred and refluxed at 90° C. for 48 h. The reaction mixture was cooled down to room temperature and product precipitated out by the addition of acetone (20 mL). The precipitate was collected by filtration, washed with acetone and dried overnight at 60° C. in a vacuum oven (10 mm Hg) to yield 24 as a brown solid (4.75 g, 90% yield). $^1$H NMR (300 MHz, DMSO-d$_6$), δ 1.25 (s, J=6.0 Hz, 24H), 2.41 (s, 3H), 2.44 (t, J=6.9 Hz, 12H), 2.48 (m, J=8 Hz, 72H), 2.74 (t, J=6.9 Hz, 12H), 3.15-3.47 (m, 24H), 3.25 (t, 12H), 3.45-3.72 (m, 28H), 4.15-4.62 (m, 6H), 4.75-4.81 (m, 7H), 5.60-5.89 (m, 14H), 7.21 (d, J=8.4 Hz, 2H), 7.52 (d, J=8.4 Hz, 2H), 8.0 (s, 6H). MS (m/z): MH+ 2638.09.

3.4 Anion Exchange Reaction for Obtaining DexAM3 or D3 (25)

CD-polyamine tosylate (24, 2.637 g, 1 mmol) was dissolved in 40 mL deionized water. A 50 mL solid-phase synthesis vessel was packed with Amberlite IRA-900 ion-exchange resin to about half the vessel volume. The solution was transferred into the solid phase vessel. After 1 h, the eluent was collected and the water was distilled off under reduced pressure using a vacuum pump. The solid residue was dried overnight at 60° C. in a vacuum oven (10 mm Hg) to yield 25 as a brown solid. Yield: (2.376 g, 95% yield). $^1$H NMR (300 MHz, DMSO-d6), δ 1.25 (s, J=6.0 Hz, 24H), 2.41 (s, 3H), 2.44 (t, J=6.9 Hz, 12H), 2.48 (m, J=8 Hz, 72H), 2.74 (t, J=6.9 Hz, 12H), 3.15-3.47 (m, 24H), 3.25 (t, 12H), 3.45-

3.72 (m, 28H), 4.15-4.62 (m, 6H), 4.75-4.81 (m, 7H), 5.60-5.89 (m, 14H), 8.0 (s, 6H). MH+ 2502.35.

3.5 Conjugation of Alexa-Fluor 594 Dye to the CD-Polyamine (26)

Alexa Fluor-594 dye-succinidimyl ester (100 nM, Molecular Probes, Invitrogen) and DexAM 3 (25, 100 nM) were dissolved in PBS buffer solution (0.5 mL). The reaction mixture was allowed to vortex for 5 minutes. After being vortexed, the mixture was shaken at room temperature for 2 h.

EXAMPLE 5

Synthesis of DexAM 4 and its conjugation to Alexa 594 dye

Figure 6:
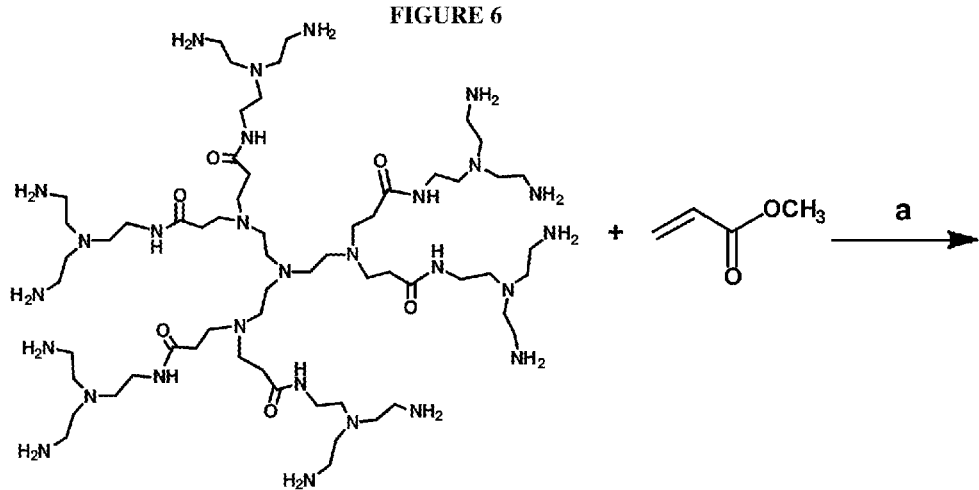
FIG. 6 depicts a scheme for the synthesis of DexAM 4 and its conjugation to Alexa 594 dye. a) MeOH, 0° C., 1 h, RT, 60 h, b) MeOH, 0° C., 1 h, RT, 7 days c) DMF, 90° C., 48 h, d) Amberlite IRA900.
Figure 6:
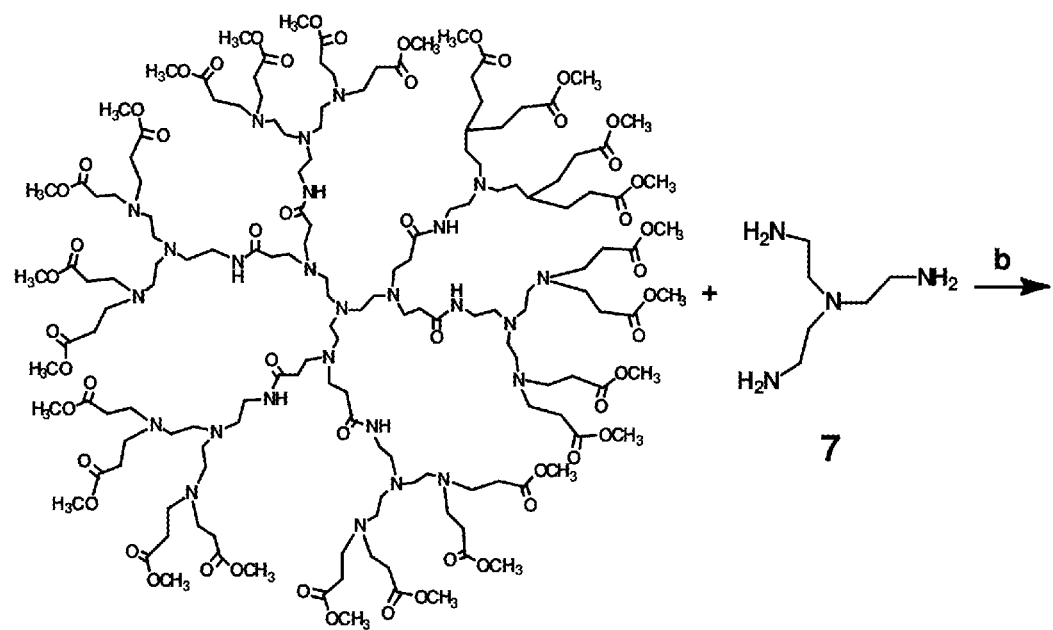
Figure 6:
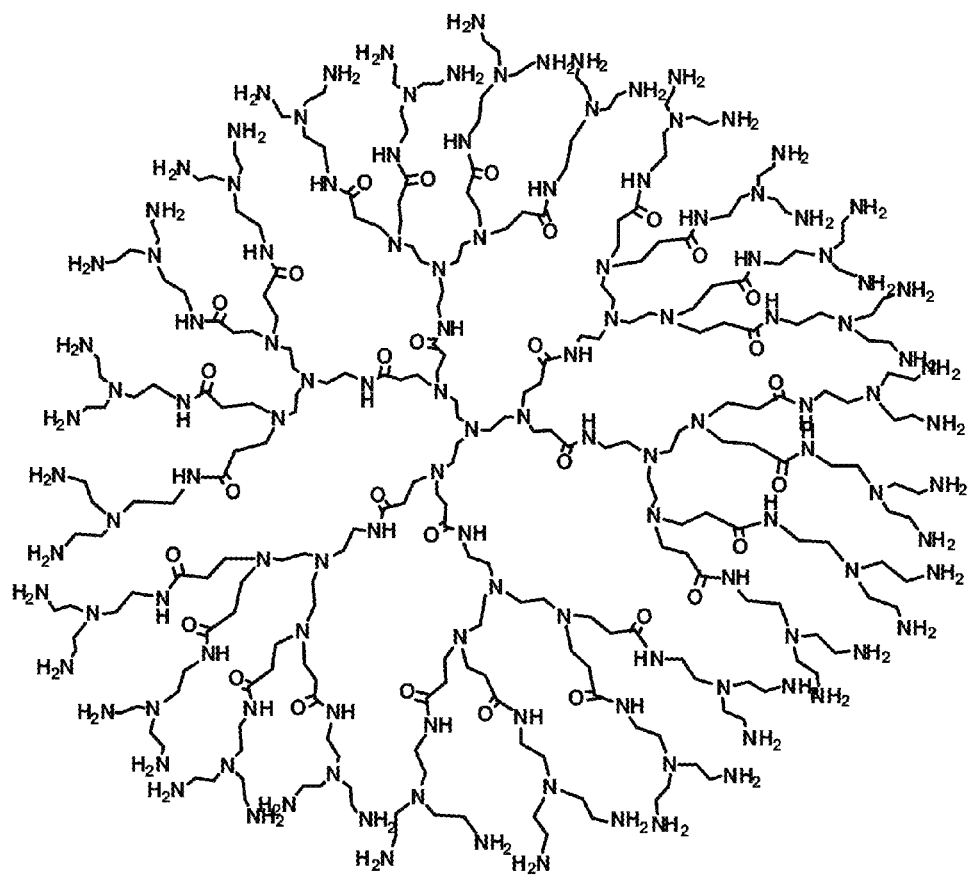
Figure 6:
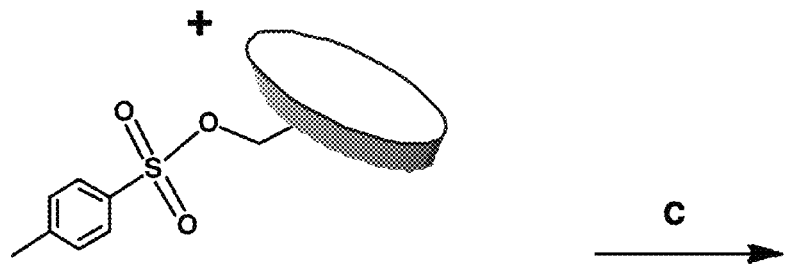
Figure 6:
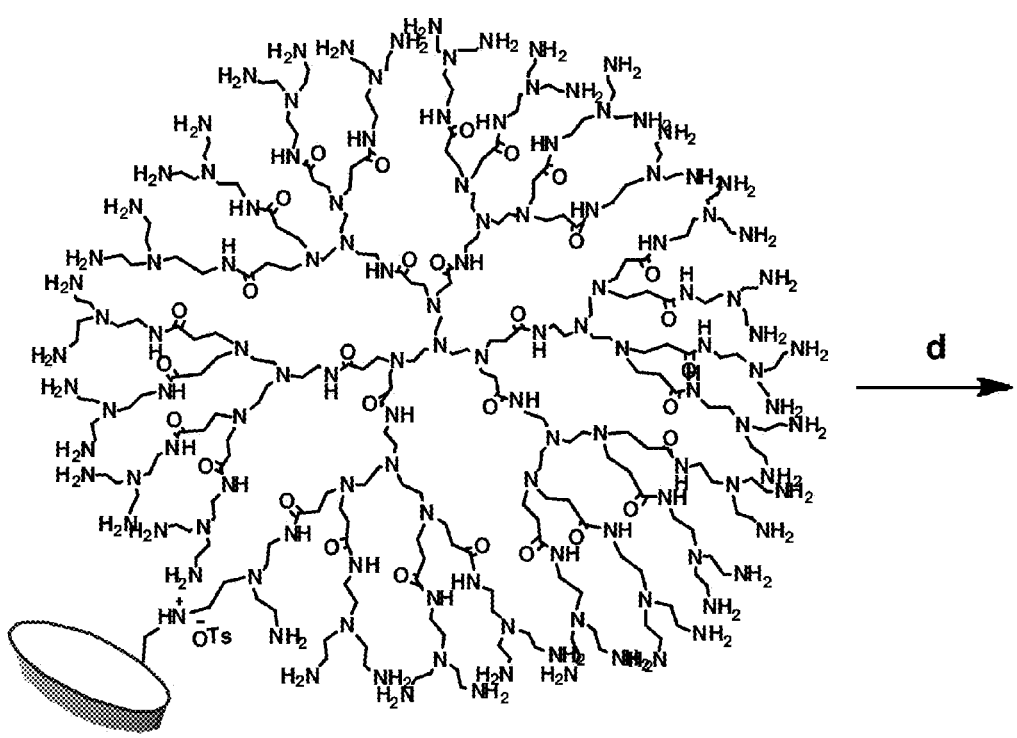
Figure 6:
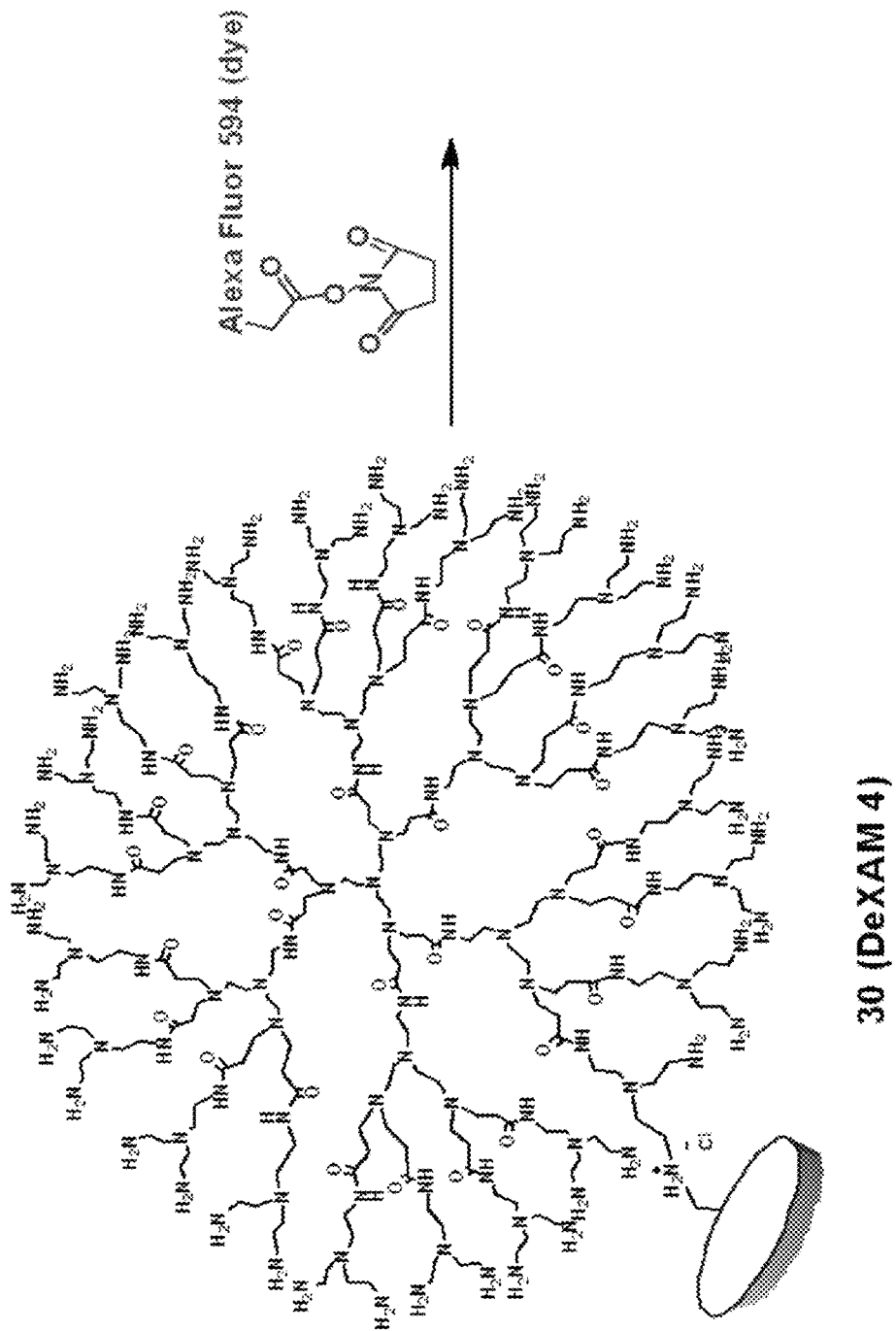

The scheme for the synthesis of DexAM 4 is depicted in FIG. 6.

4.1 Synthesis of Methyl Ester of 23 (27)

A solution of 23 (1.48 g, 1.1 mmol) in methanol (5 mL) was added dropwise to a stirred solution of methyl acrylate (2.84 g, 33.0 mmol) in methanol (5 mL) for 1 h in an ice bath. The resulting solution was stirred for 30 min in an ice bath and then for 60 h at room temperature. The volatiles were removed under reduced pressure. The residue was purified by column chromatography using DCM:MeOH (10:1 v/v) to afford the desired product (27) as a yellow oil. Yield: (3.41 g, 91%); NMR (300 MHz, CDCl$_3$): δ 2.44 (t, J=6.9 Hz, 12H), 2.49 (s, J=6 Hz, 12H), 2.74 (t, J=6.9 Hz, 12H), 3.67 (s, 18H). MS (m/z): calculated, 3410.03 for $C_{158}H_{284}N_{26}O_{54}$; found, 3435.08 for [M+Na]+.

4.2 Synthesis of the Polyamine of DexAM 4 (28)

A solution of ester 27 (3.41 g, 1 mmol) in methanol (20 mL) was added dropwise to a stirred solution of tris(aminoethyl)amine (7, 7.02 g, 48 mmol) in methanol (20 mL) over a period of 1 h in an ice bath. The resulting solution was allowed to warm to room temperature and stirred for 7 days at room temperature at which time no methyl ester was detectable by NMR spectroscopy. The solvent was removed under reduced pressure the excess tris(aminoethyl)amine was removed using an azeotropic mixture of toluene:MeOH (90:10 v/v). The product was further purified by washing with anhydrous ether twice, yielding a highly viscous liquid. Finally the product was kept under vacuum to provide the amino-terminated final product (28) as a light yellow liquid. Yield (6.1 g, 99%); NMR (300 MHz, CDCl$_3$): δ 1.25 (s, J=6.0 Hz, 24H), 2.44 (t, J=6.9 Hz, 12H), 2.48 (m, J=8 Hz, 72H), 2.74 (t, J=6.9 Hz, 12H), 3.25 (t, 12H), 8.0 (s, 6H). MS (m/z): calculated, 6151.06 for $C_{276}H_{618}N_{24}O_{30}$; found, 6177.66 for [M+Na]+.

4.3 Synthesis of Water-Soluble CD-Polyamine Tosylate (29)

Tosylated CD (2, 1.29 g, 1 mmol) and polyamine of DexAM 4 (28, 6.1 g, 1 mmol) were dissolved in DMF (10 mL) in a 25 mL one-necked round-bottomed flask equipped with Liebig's condenser and a stir bar. The flask was degassed and purged with nitrogen. The mixture was stirred and refluxed at 90° C. for 48 h. The reaction mixture was cooled down to room temperature and product precipitated out by the addition of acetone (20 mL). The precipitate was collected by filtration, washed with acetone and dried overnight at 60° C. in a vacuum oven (10 mm Hg) to yield 29 as a brown solid. Yield: (6.6 g, 89%); $^1$H NMR (300 MHz, DMSO-d6), δ 1.25 (s, J=6.0 Hz, 24H), 2.41 (s, 3H), 2.44 (t, J=6.9 Hz, 12H), 2.48 (m, J=8 Hz, 72H), 2.74 (t, J=6.9 Hz, 12H), 3.15-3.47 (m, 24H), 3.25 (t, 12H), 3.45-3.72 (m, 28H), 4.15-4.62 (m, 6H), 4.75-4.81 (m, 7H), 5.60-5.89 (m, 14H), 7.21 (d, J=8.4 Hz, 2H), 7.52 (d, J=8.4 Hz, 2H), 8.0 (s, 6H). MH+ 7444.84 or 8733.01

4.4 Anion Exchange Reaction for Obtaining DexAM 4 or D4 (30)

CD-polyamine tosylate (29, 3.72 g, 0.5 mmol) was dissolved in 40 mL deionized water. A 50 mL solid-phase synthesis vessel was packed with Amberlite IRA-900 ion-exchange resin to about half the vessel volume. The solution was transferred into the solid phase vessel. After 1 h, the eluent was collected and the water was distilled off under reduced pressure using a vacuum pump. The solid residue was dried overnight at 60° C. in a vacuum oven (10 mm Hg) to yield 30 as a brown solid. Yield: (3.47 g, 95%); $^1$H NMR (300 MHz, DMSO-d6), δ 1.25 (s, J=6.0 Hz, 24H), 2.41 (s, 3H), 2.44 (t, J=6.9 Hz, 12H), 2.48 (m, J=8 Hz, 72H), 2.74 (t, J=6.9 Hz, 12H), 3.15-3.47 (m, 24H), 3.25 (t, 12H), 3.45-3.72 (m, 28H), 4.15-4.62 (m, 6H), 4.75-4.81 (m, 7H), 5.60-5.89 (m, 14H), 8.0 (s, 6H). MH+ 7309.10 or 8462.53.

4.5 Conjugation of Alexa-Fluor 594 Dye to DexAM 4 (31)

Alexa Fluor-594 dye (100 nM, Molecular Probes) and DeXAM 4 (30, 100 nM) were dissolved in PBS buffer solution (0.5 mL). The reaction mixture was allowed to vortex for 5 minutes. After being vortexed, the mixture was shaken at room temperature for 3 h.

EXAMPLE 6

Synthesis of Erlotinib

Figure 7:
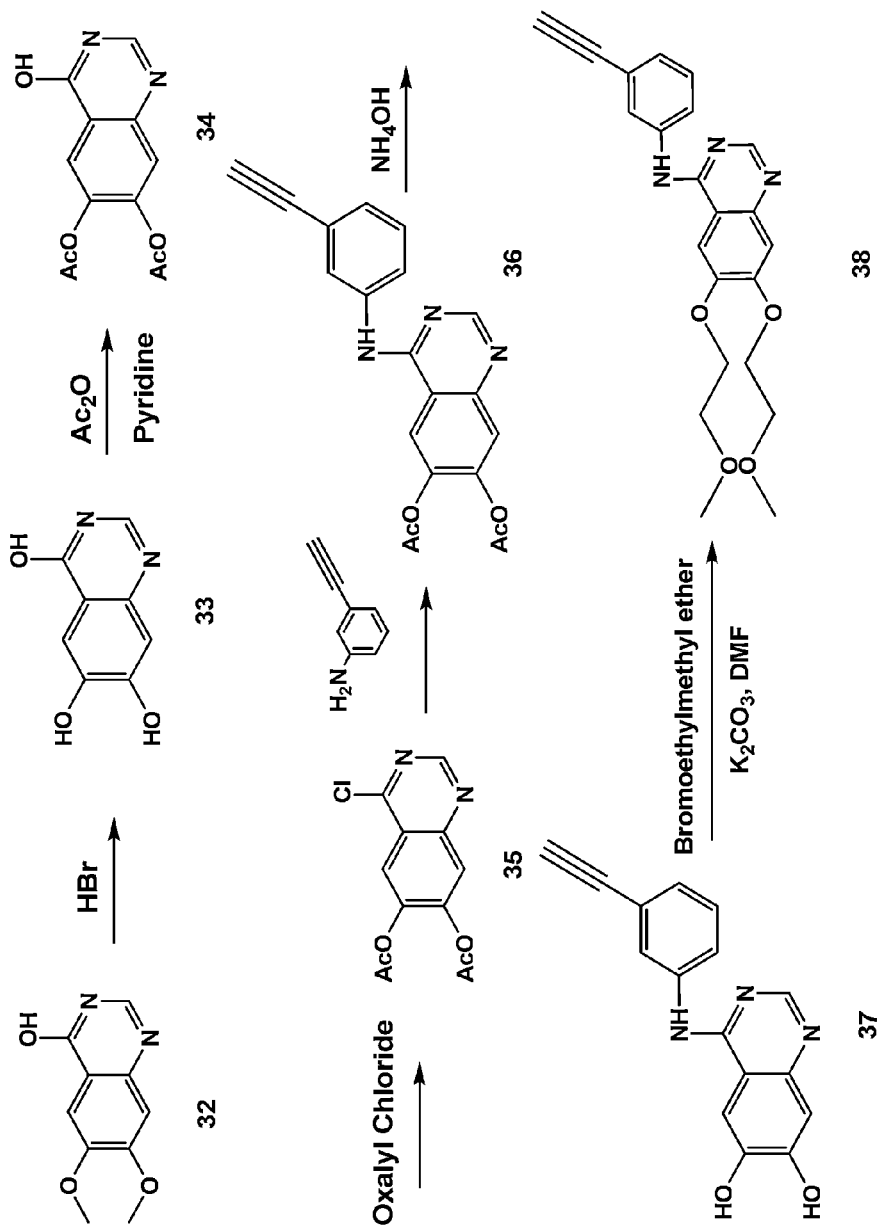
FIG. 7 depicts a scheme for the synthesis of Erlotinib.

The EGFR tyrosine kinase inhibitor N-(3-ethynylphenyl)-6,7-bis(2-methoxyethoxy)quinazolin-4-amine (commonly known as Erlotinib) was synthesized using previously reported protocols (Knesl et al. (2006) *Molecules* 11:286-297) with slight modifications (FIG. 7). Briefly, 5.0 g of the 6,7-dimethoxyquinazolone (32) was suspended in concentrated HBr and refluxed under nitrogen to obtain 33 as a white solid. This was then suspended in 23 mL of acetic anhydride in presence of 200 μL of pyridine. The reaction mixture was refluxed under nitrogen for 3 h and the acetic anhydride/acetic acid was removed in vacuo to yield the diacetate (34) in 91% yield. The diacetate was converted to the chloro derivative (35) by reacting it with oxalyl chloride which was then reacted with 3-ethynylaniline to yield 36 as an off-white solid. The product was converted to the dihydroxy derivative (37) by hydrolysis using conc. NH$_4$OH. 37 was dissolved in 10 mL of dry DMF followed by the addition of 11.4 g of K$_2$CO$_3$. Potassium Iodide (2 g) and bromomethylethyl ether (3.5 g) were added to the above solution and stirred overnight at 45° C. The solvent was removed in vacuo, dissolved in DCM, washed with water and dried over MgSO$_4$. The solvent was evaporated to obtain the product (38) as a brown solid. Yield: (3.56 g, 95%); $^1$H NMR (CDCl$_3$) 8.60 (s, 1H), 7.96 (w, 1H), 7.85 (s, 1H), 7.70-7.76 (m, 1H), 7.42-7.36 (m, 3H), 7.12 (s, 1H), 4.13-4.21 (m, 4H), 3.73-3.78 (m, 4H), 3.40 (s, 3H), 3.08 (s, 1H).

EXAMPLE 7

Synthesis of Suberoylanilide Hydroxamic Acid

Figure 8:
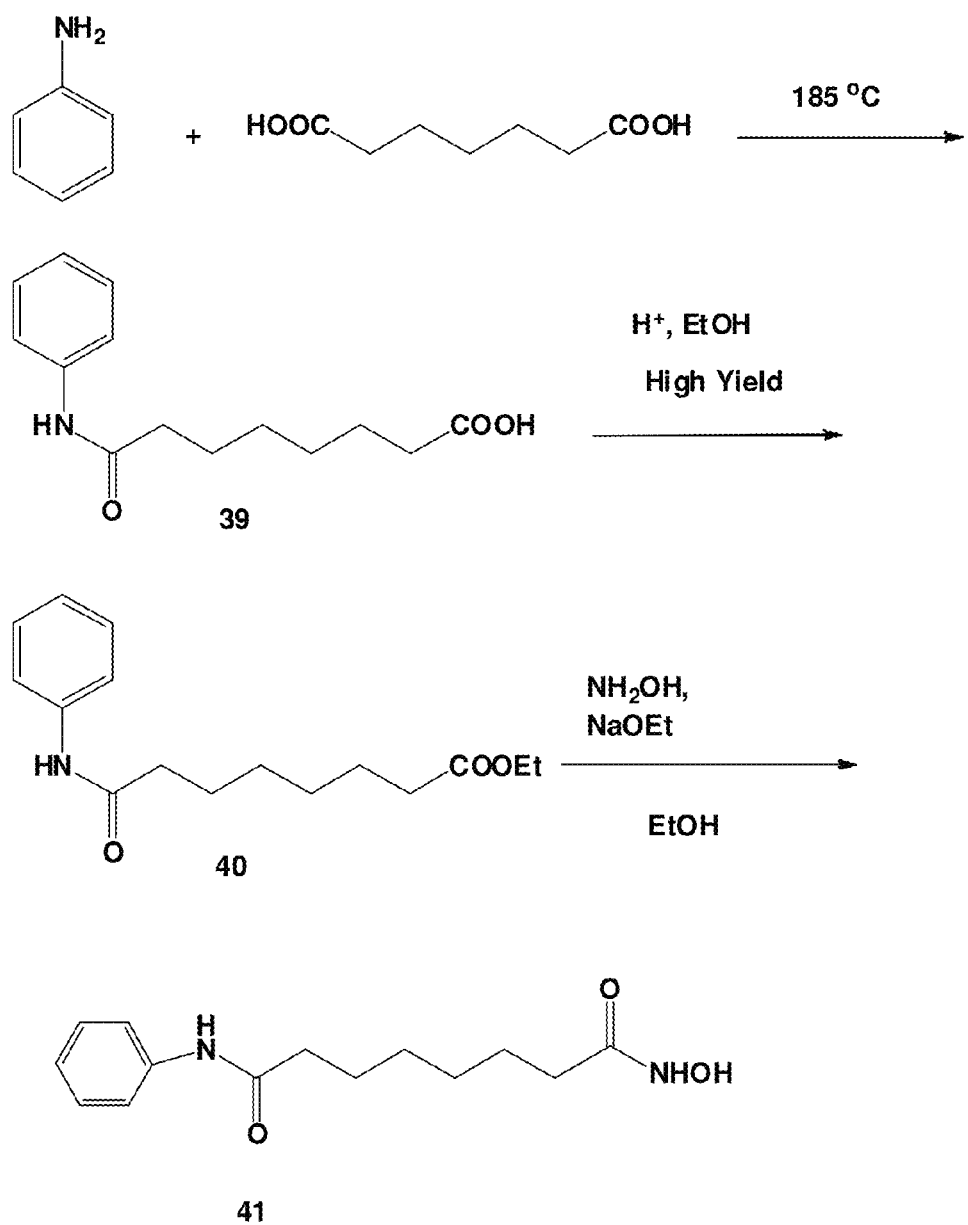
FIG. 8 depicts a scheme for the synthesis of suberoylanilide hydroxamic acid (SAHA).
Figure 9:
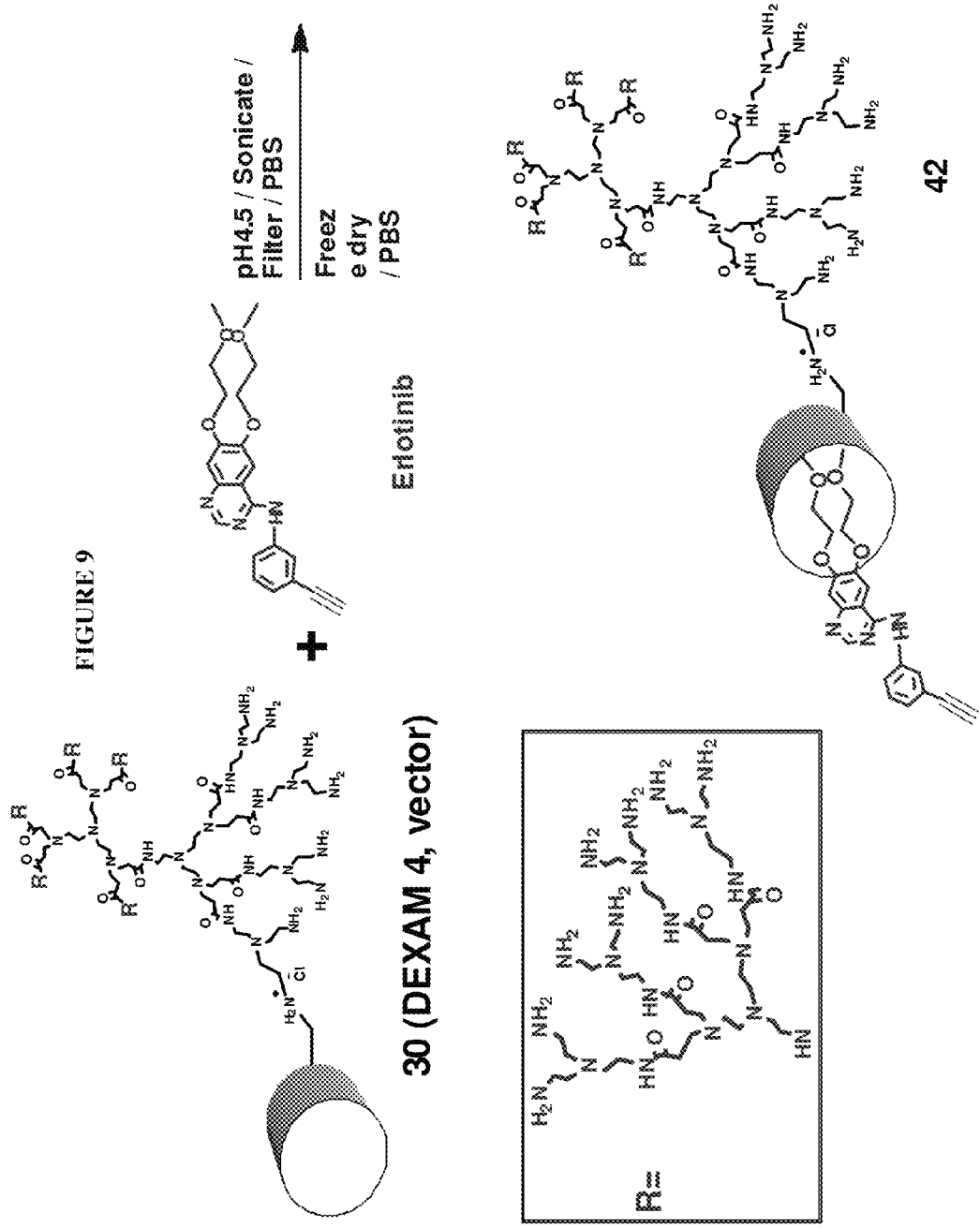
FIG. 9 depicts a scheme for the inclusion of anticancer drugs into DexAM 4.
Figure 9:
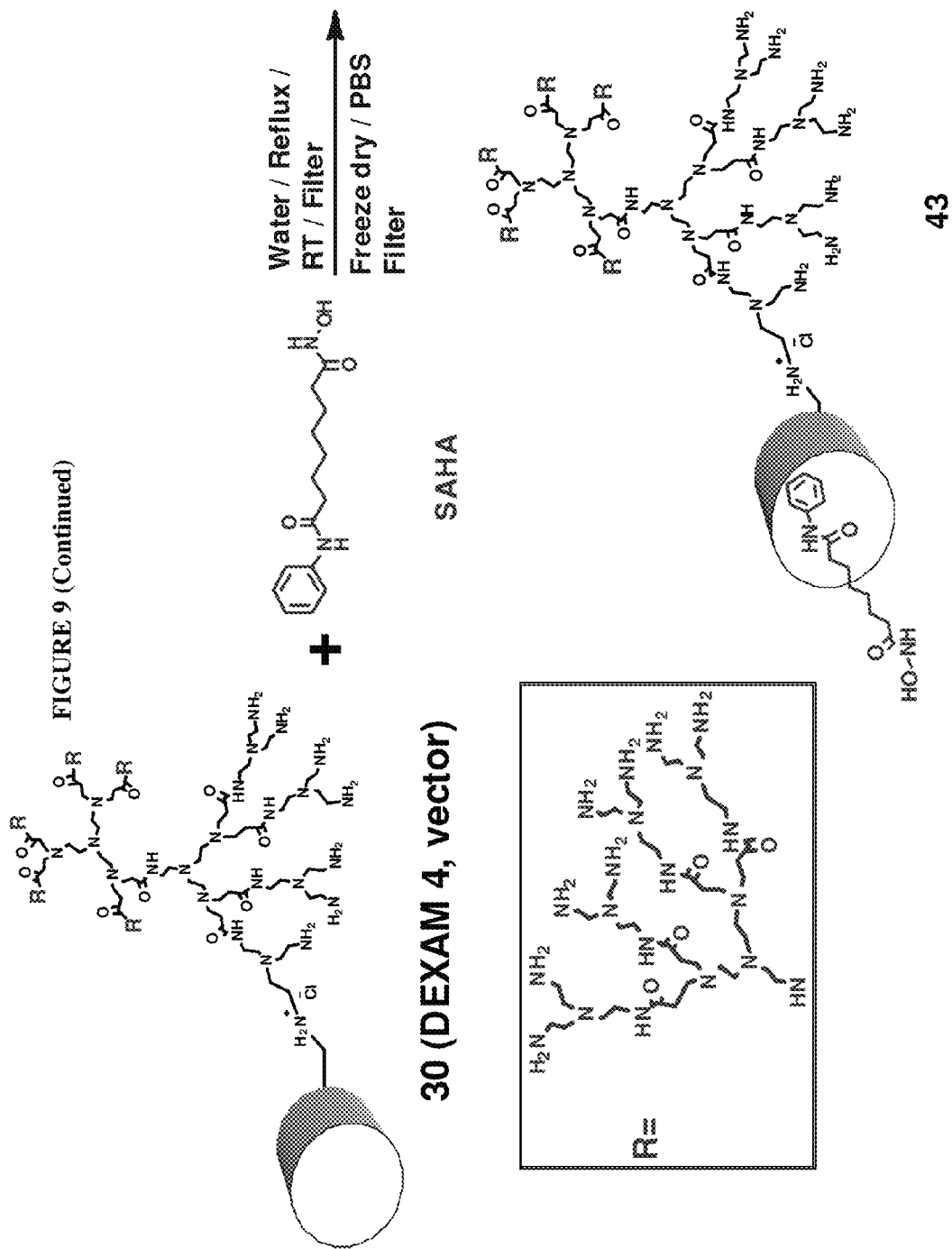
Figure 10:
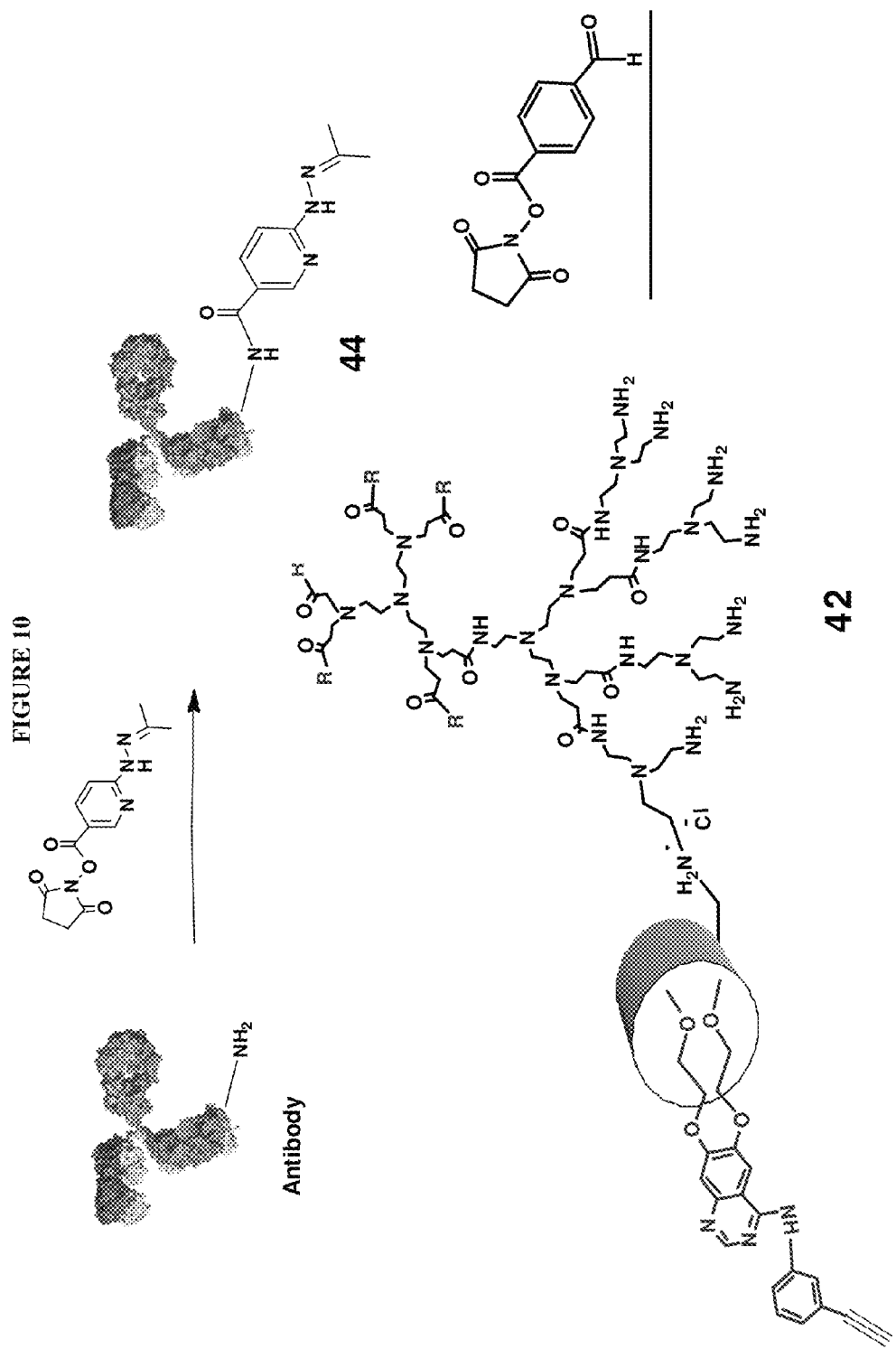
FIG. 10 depicts a scheme for conjugation of EGFR antibody to DexAM 4 complexes.
Figure 10:
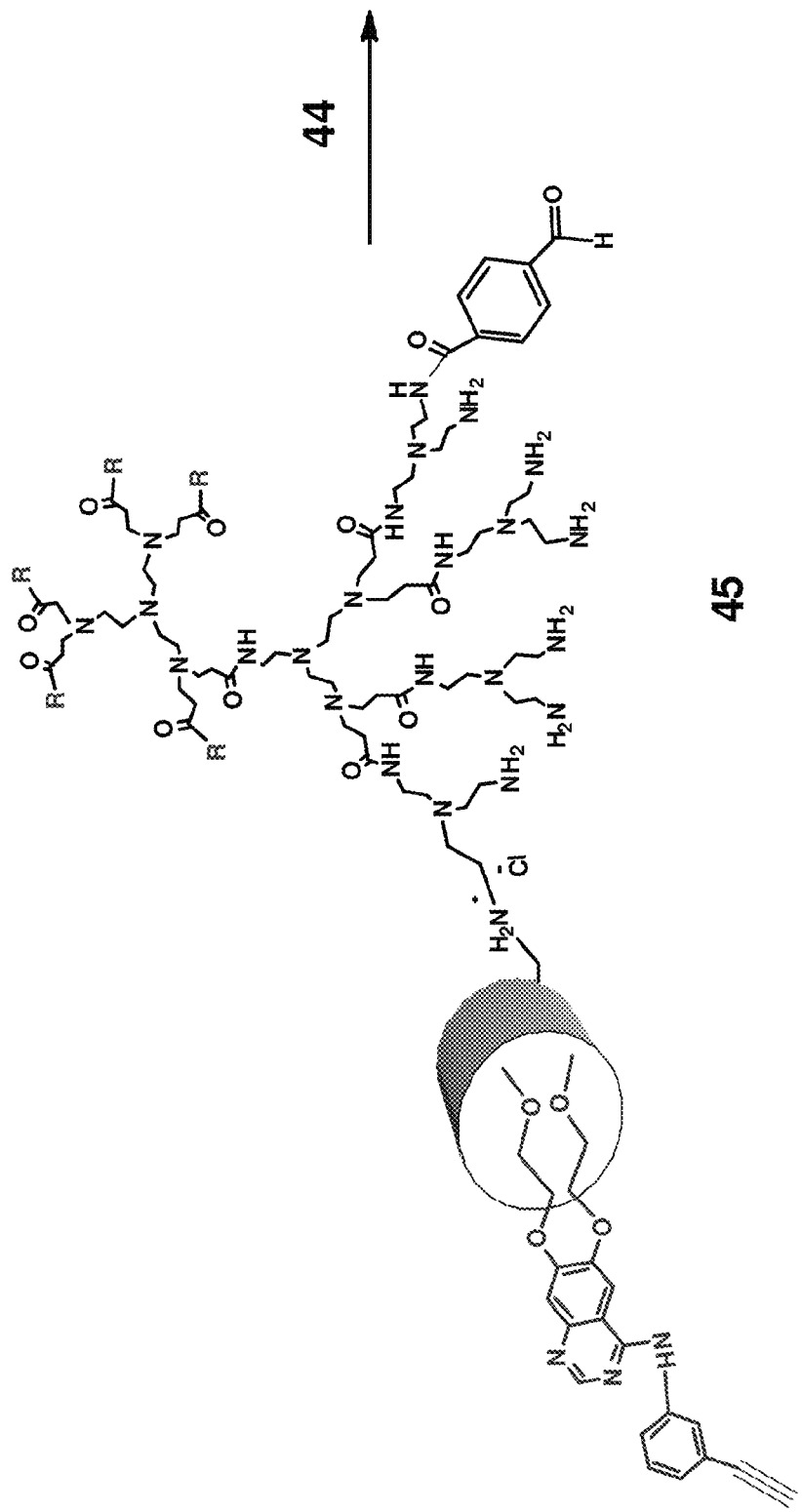
Figure 10:
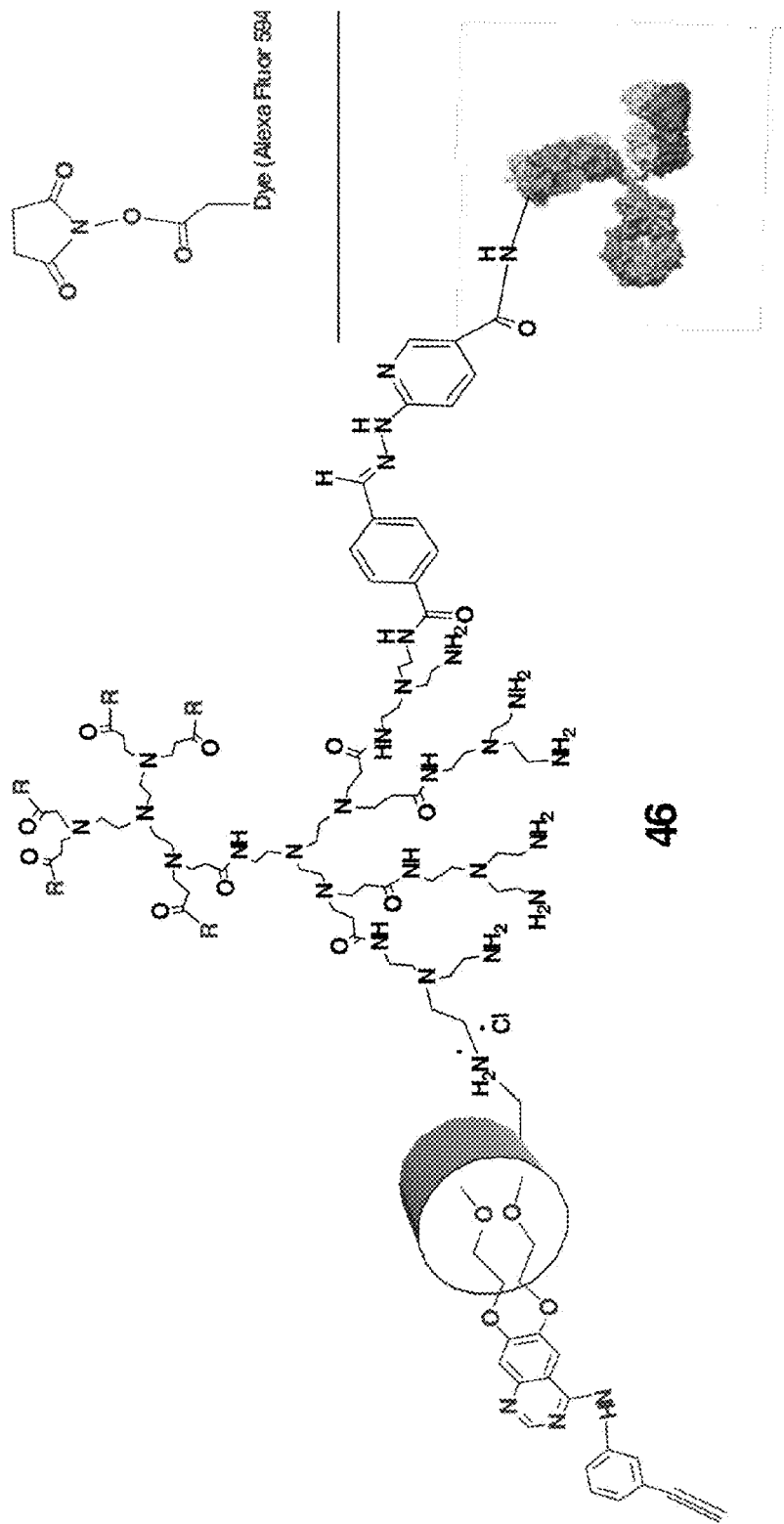
Figure 10:
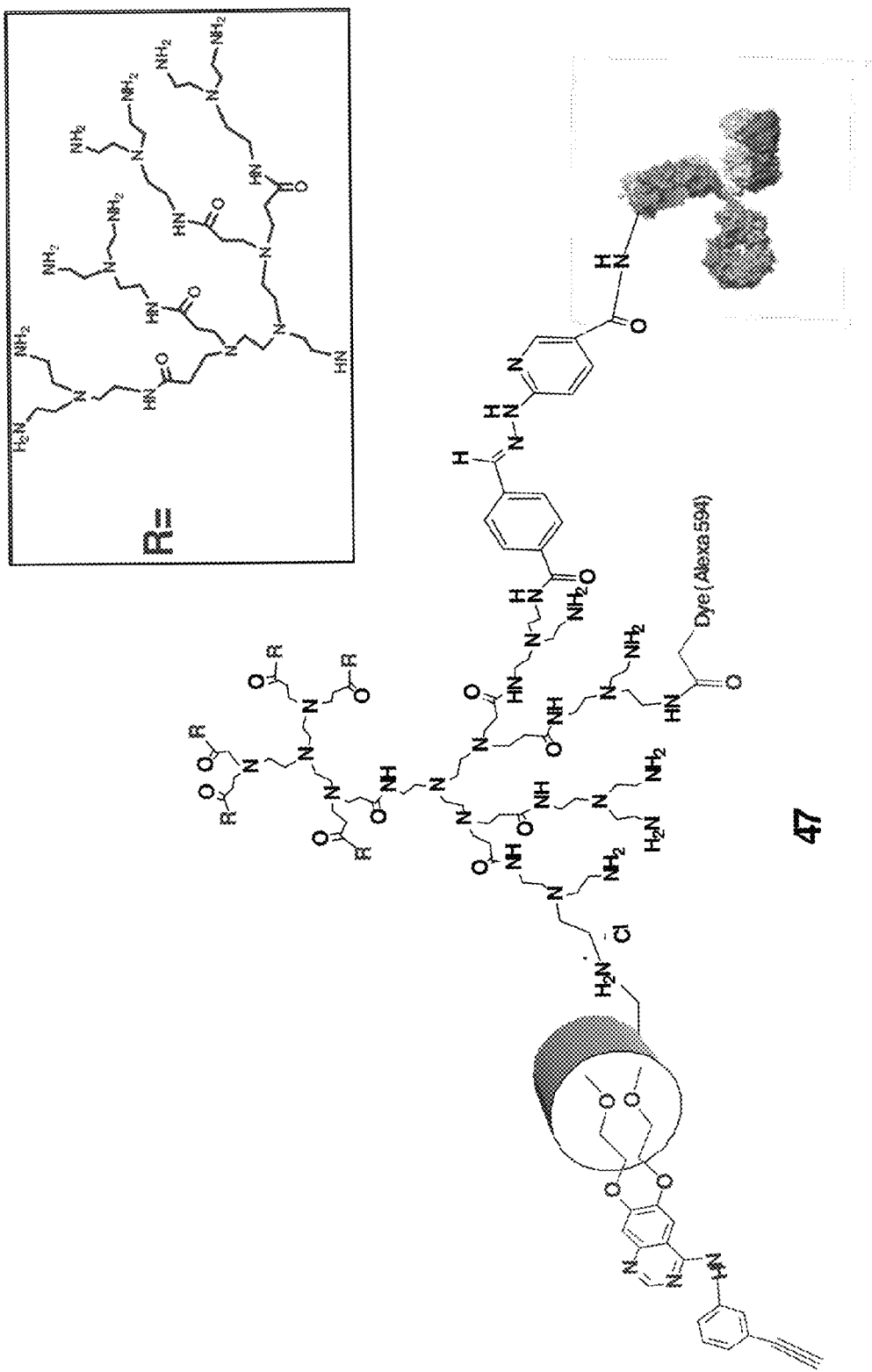
Figure 11:
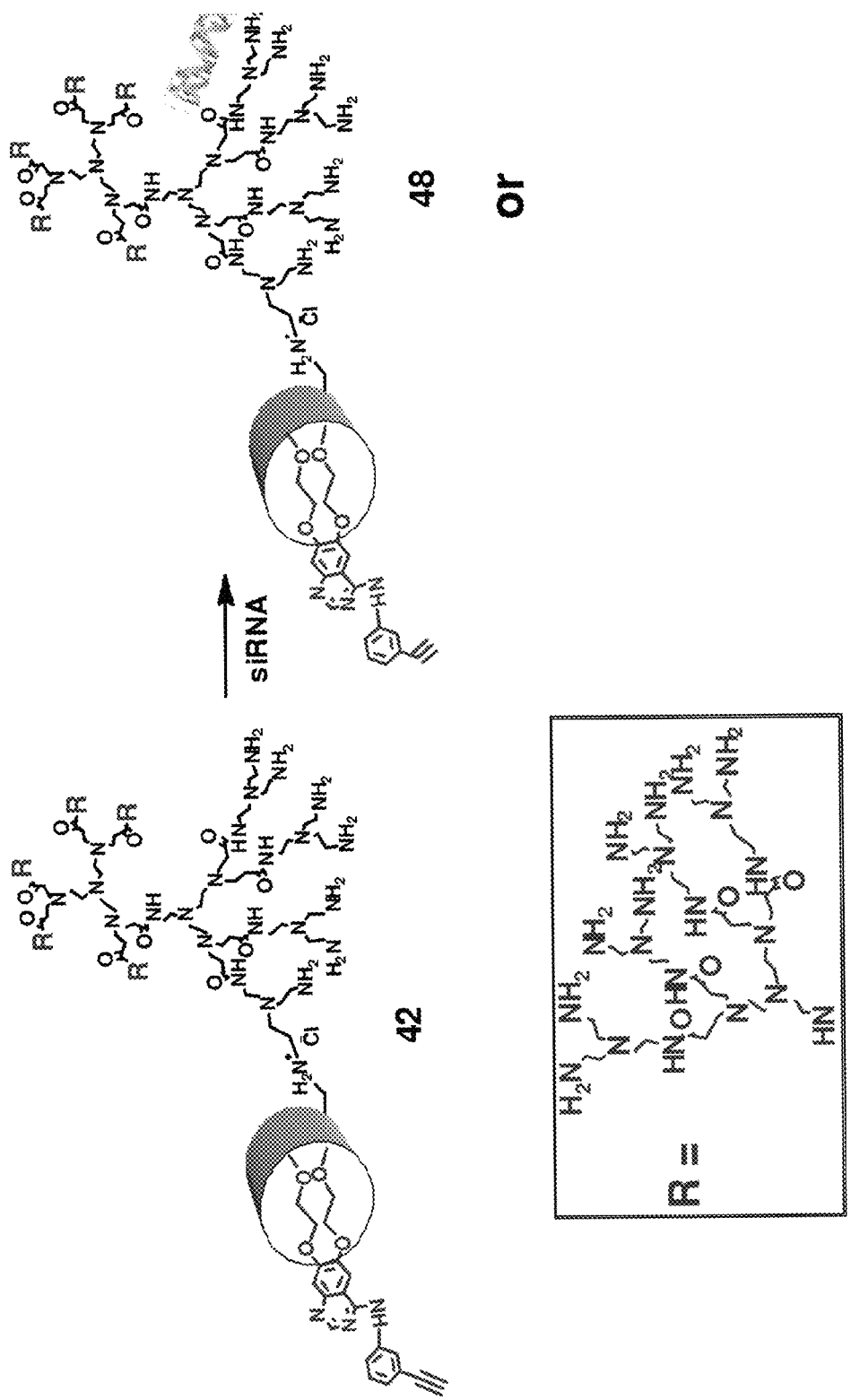
FIG. 11 depicts a scheme for polyplex formation using antibody-modified DexAMs and siRNA.

The histone deacetylase inhibitor suberoylanilide hydroxamic acid (SAHA) was synthesized according to previously reported methods (Stowell et al. (1996) *J. Med. Chem.* 38:1411-1413) (FIG. 8). Briefly, freshly distilled aniline (4.09 g, 0.044 mol) and suberic acid (6.96 g, 0.040 mol) were heated at 185-190° C. for 10 min to yield suberanilic acid (39) as a white solid in 41% yield. This was then converted to the methyl ester (40) by refluxing with methanol for 22 h. Hydroxylamine hydrochloride (2.17 g, 0.0312 mol) was dissolved in 15 mL of ethanol in a 50 mL flask equipped with magnetic stirring and an addition funnel. Solid methyl suberanilate (4.10 g, 0.0156 mol) was added, which dissolved readily, followed by the addition of sodium methoxide solution. The reaction was mixture for stirred for 26 h at room temperature and then rinsed with 100 mL of water where most of it dissolved. Glacial acetic acid (4.0 g) was added with stirring. The resulting heavy precipitate was filtered, rinsed with water, then slurried with another 75 mL of water, filtered, and rinsed again. The solid was dried at room temperature, affording the product (41) as a white solid. Yield: (1.82 g, 47%); MP=159-160.5° C.; $^1$H NMR (DMSO-d6) 10.33 (s, 11H), 9.84 (s, 11H), 8.66 (s, 11H), 7.57 (d, J=7.61, 2H), 7.27 (t, J=7.2, 2H), 7.00 (t, J=7.4, 1H), 2.27 (t, J=7.61, 2H), 1.92 (t, J=7.4, 2H), 1.56 (p, J=6.7, 2H), 1.47 (p, J=6.21, 2H), 1.26 (m, 4H).

EXAMPLE 8

Inclusion of Anticancer Drugs into DexAM 4

7.1 Formation of Erlotinib-DexAM 4 Inclusion Complex (42)

Erlotinib (5 mg, 13 µmol) was dissolved in 10 mL of acetate buffer (pH=4.5). The erlotinib solution was added to vials containing pure DexAM 4 (26 µmol). The contents of the vials were vortexed for 10 min, sonicated for 30 min and stirred vigorously for 8 h. The resulting complex was freeze-dried. Thereafter, 200 µL of PBS was added to the DexAM complex (10 µmol) and allowed to stand at room temperature to dissolve for a few minutes. The solution was then filtered and purified using an appropriate molecular weight cut-off (MWCO) centrifugal filter (Millipore, Billerica, Mass., USA).

7.2 Formation of SAHA-DexAM 4 Inclusion Complex (43)

Suberoylanilide hydroxamic acid (SAHA) was solubilized in 2 molar equivalents of DexAMs in distilled water. Briefly, 8 mg of SAHA was added to a solution of 370 mg of DexAM 4 in 3 mL of water, heated until fully dissolved, stirred for 8 h, and then rapidly cooled on ice to room temperature. This solution was filtered and freeze-dried. Thereafter, 200 µL PBS was added to DexAM complex (10 µmol) and allowed to stand at room temperature to dissolve for a few minutes. Finally, the complex was purified through by centrifugal filtration using an appropriate MWCO membrane. DexAM-SAHA solutions of various concentrations were prepared by maintaining the molar ratio between SAHA and DexAMs.

EXAMPLE 9

Conjugation of EGFR Antibody to DexAM 4 Complexes

8.1 Functionalization of Antibody with 6-Hydrazinonicotinamide (44)

6-hydrazinonicotinamide (HyNic), an aromatic hydrazine was attached to the amine group of antibody. Briefly, 6-hydrazinonicotinamide (11 nM, HyNic, SoluLinK) and EGFR Antibody (10 nM) were mixed in 2 mL of buffer (pH=6.0) and vortexed for 5 minutes. After being vortexed, the mixture was shaken at room temperature for 2 h.

8.2 Functionalization of DexAM with 4-Formylbenzamide (45)

4-formylbenzamide (4FB), an aromatic aldehyde was linked to the amine group of DeXAMs. Briefly, 4-FB (11 nM, SoluLinK) and DeXAM 4 (10 nM) were dissolved in 2 mL buffer (pH=6.0) and the reaction mixture vortexed for 5 minutes. After being vortexed, the mixture was shaken at room temperature for 2 h.

8.3 Antibody Conjugation to DexAMs (46)

44 and 45 were vortexed together for a few minutes at room temperature thereby leading to the formation of a stable bis-aryl hydrazone bond between the antibody and DexAM 4 (46). A similar conjugation strategy was used for attaching the antibody to DexAM 4-SAHA complex (43)

8.4 Conjugation of Alexa Fluor-594 Dye to Antibody-Modified DexAMs (47)

Alexa Fluor-594 (100 nM. Molecular Probes, Invitrogen) and EGFR antibody-conjugated DexAM 4 (46, 100 nM) were dissolved in PBS buffer solution (0.5 mL) and vortexed for 5 minutes. After being vortexed, the mixture was shaken for 2 h at room temperature.

EXAMPLE 10

Delivery of Therapeutic Agents by DexAMs

Figure 2:
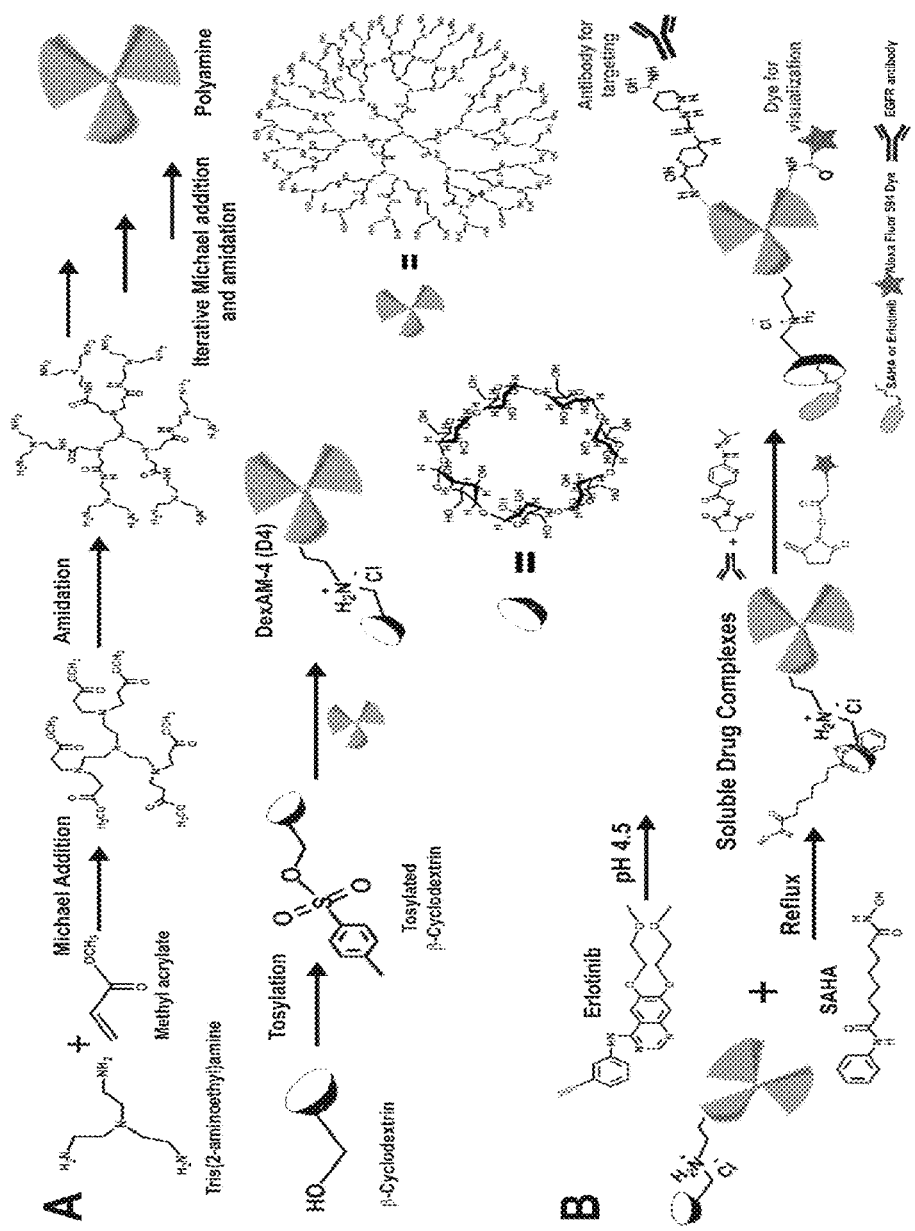
FIG. 2A shows a schematic representation of a method of synthesis of DexAMs.
FIG. 2B depicts a scheme for conjugation of drugs and antibodies to DexAMs.

Using multistep solution-phase and solid-phase synthesis as described in the foregoing examples, a series of highly water-soluble dendritic polyamine compounds conjugated to one or more β-cyclodextrin (β-CD), referred to as DexAMs, were generated (FIGS. 2 A and B). The first step for synthesizing DexAM involved generating a dendritic polyamine backbone by Michael addition of tris(2-aminoethyl)amine and methyl acrylate, followed by amidation of the amino esters generated after Michael addition. The use of tris(2-amino ethyl)amine as the core initiator yielded higher surface amine groups and hence more compact dendrimers as compared to the reported synthetic methods (for e.g. ethylenediamine, ammonia) for PAMAM dendrimers disclosed by Tomalia et al. (1985) *Polymer J.* 17:117-132. The conjugation of β-cyclodextrin to the polyamine backbone involved tosylation of β-cyclodextrin, followed by nucleophilic addition with amine group. Compared to the previously reported protocol of Tang et al. (2008) *Nat. Prot.* 3:691-697, where tosyl chloride was used for regioselective tosylation of β-cyclodextrin resulting in very low yields, the synthetic yield (~50%) and purity were improved by using tosylimidazole, instead of tosyl chloride, under reflux conditions to generate 6-monotosylated β-cyclodextrin. In the final step, polyamine backbone was conjugated to tosylated-CD via nucleophilic addition to generate cyclodextrin conjugated polyamines resulting in a 25-fold increase in the aqueous solubility of CD (>50 g/100 mL) as compared to that of CD alone (<1.8 g/100 mL), owing to generation of an aminium salt.

As described in the foregoing examples, two hydrophobic anticancer drugs [Erlotinib and Suberoylanilide hydroxamic acid (SAHA)] were synthesized and loaded into the β-CD cavity by optimized protocols. For instance, by utilizing the pH-dependent solubility of erlotinib, drug was loaded up to almost 50% of the molar ratio of β-CD, resulting in a significant increase in its aqueous solubility (178 mg/100 mL) (Lee et al. (2009) *Drug Dev. Ind. Pharm.* 35:1113-1120; Khramov et al. (1999) *Analyst* 124:1027-1033). Similarly, SAHA was complexed with β-CD under reflux conditions to obtain highly water-soluble SAHA-CD complexes (solubility—175 mg/100 mL).

The second component of the DexAMs—dendritic polyamine backbone provides a positive surface charge which can interact electrostatically with the negatively charged nucleic acids, condensing them into cationic complexes (known as polyplexes), thus facilitating their intracellular uptake and endosomal escape (Pack et al. (2005) *Nat. Rev. Drug Disc.* 4:581-593; Wang et al. (2010) *Chem. Comm.* 46:1851-1853; Wang et al. (2009) *Angew. Chemie-Int. Ed.* 48:4344-4348). However, these primary/tertiary amines are also responsible for cytotoxicity by interacting with the cellular components and interfering in the cellular processes (Pun et al. (2004) *Bioconjug. Chem.* 15:831-840). The synthetic methods described in the foregoing examples enabled precise control of the number of primary amine head groups from 4 to 48 leading to four different generations of DexAMs molecules (D1-D4), thereby allowing achievement of an optimal balance between cytotoxicity and complexation ability.

Figure 12:
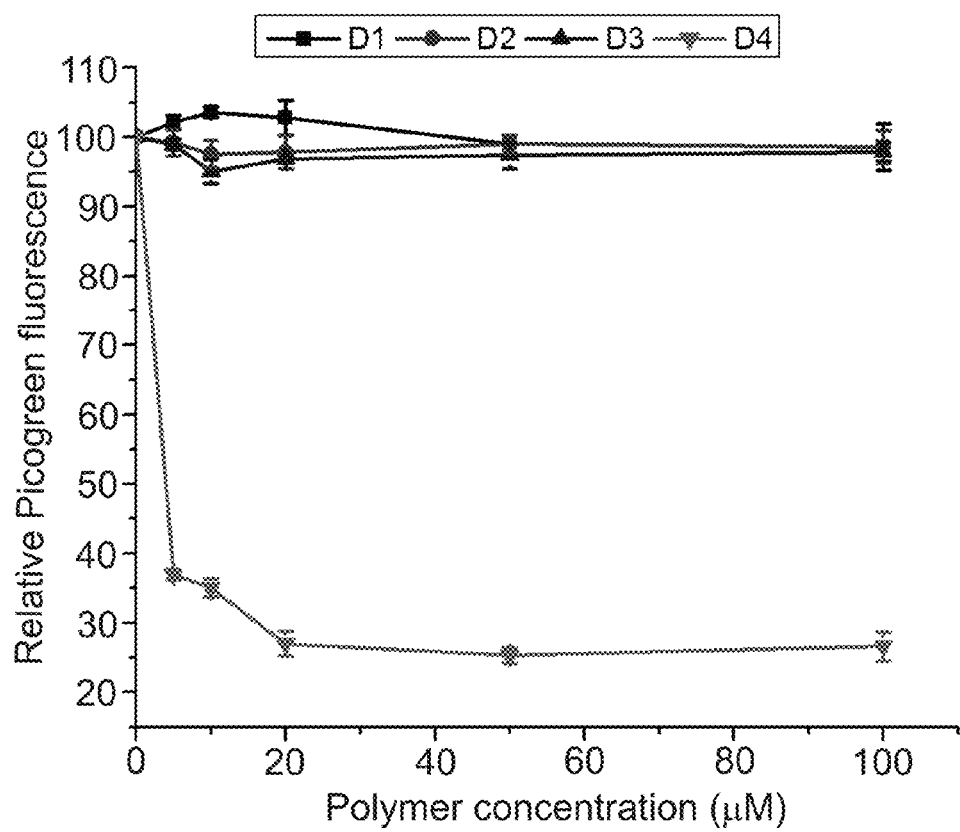
FIG. 12 is a graph showing siRNA complexation ability of DexAMs using a Picogreen dye exclusion assay. (Absorption=480 nm; Emission=520 nm).
Figure 13:
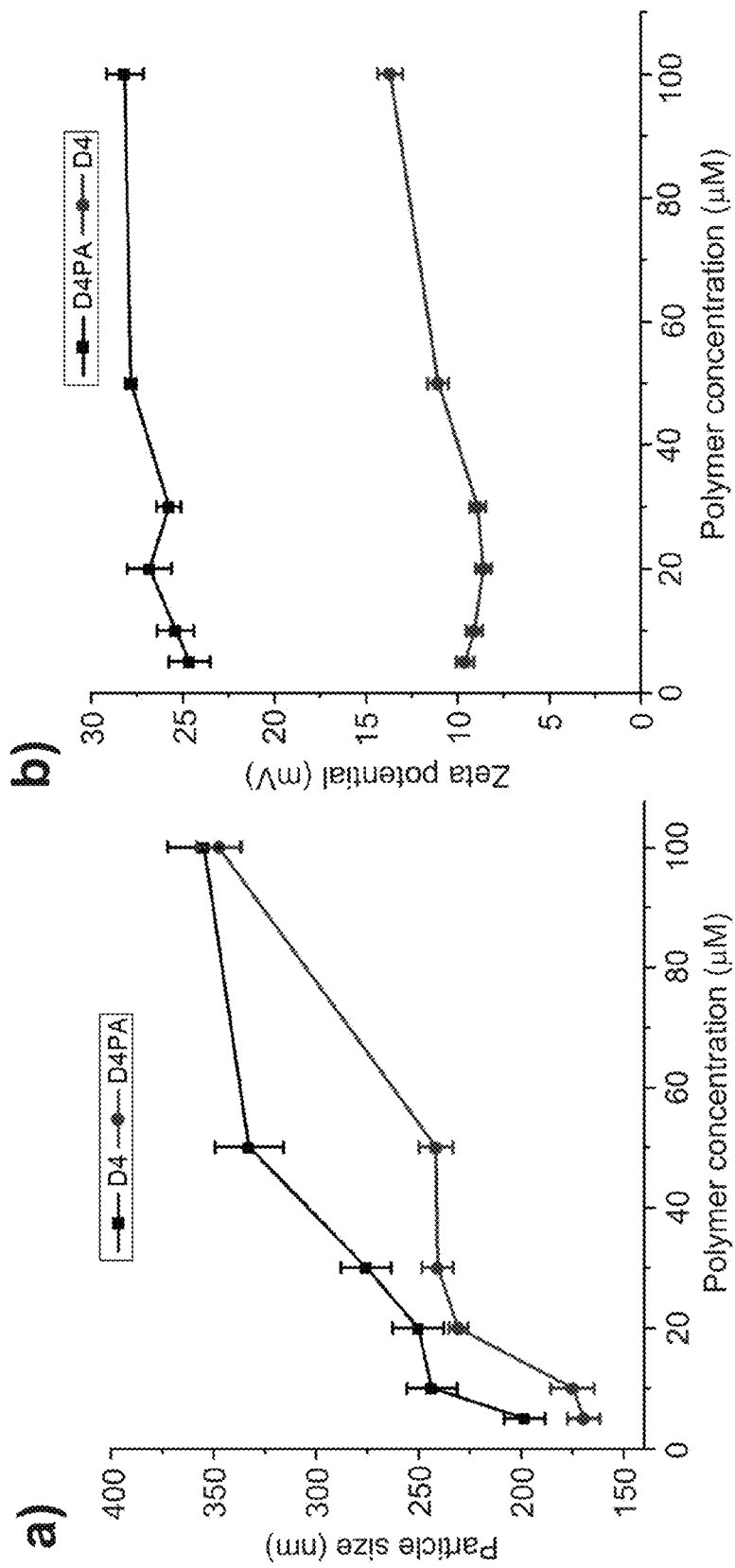
FIGS. 13A and 13B are graphs comparing the particle diameters (A) and zeta potentials (B) of polyamines with and without cyclodextrins. The results are an average of three independent experiments and their respective standard errors.

The capability of four different generations of DexAMs (D1-D4) to spontaneously form complexes with the negatively charged siRNA was assessed using a well-established dye exclusion assay. As the number of amine groups increased from DexAM-1 (D1, 4 primary amines) to DexAM-4 (D4, 48 primary amines), the amount of free/unbound siRNA decreased correspondingly at a given DexAM concentration (FIG. 12). Since it was found that the complexation ability of DexAM-4 is higher than that of the other generations with minimal cytotoxicity, DexAM-4 was used for the subsequent experiments. Additionally, the hydrodynamic diameters of the resultant polyplexes could be controlled from 250 to 400 nm with polydispersity index of 0.8-1.0 by increasing the polymer concentration (FIG. 13A). The zeta potentials of the resulting polyplexes were in the range of 8-10 mV at pH 7.4 (FIG. 13B), demonstrating the cationic nature of the polyplexes.

Figure 14:
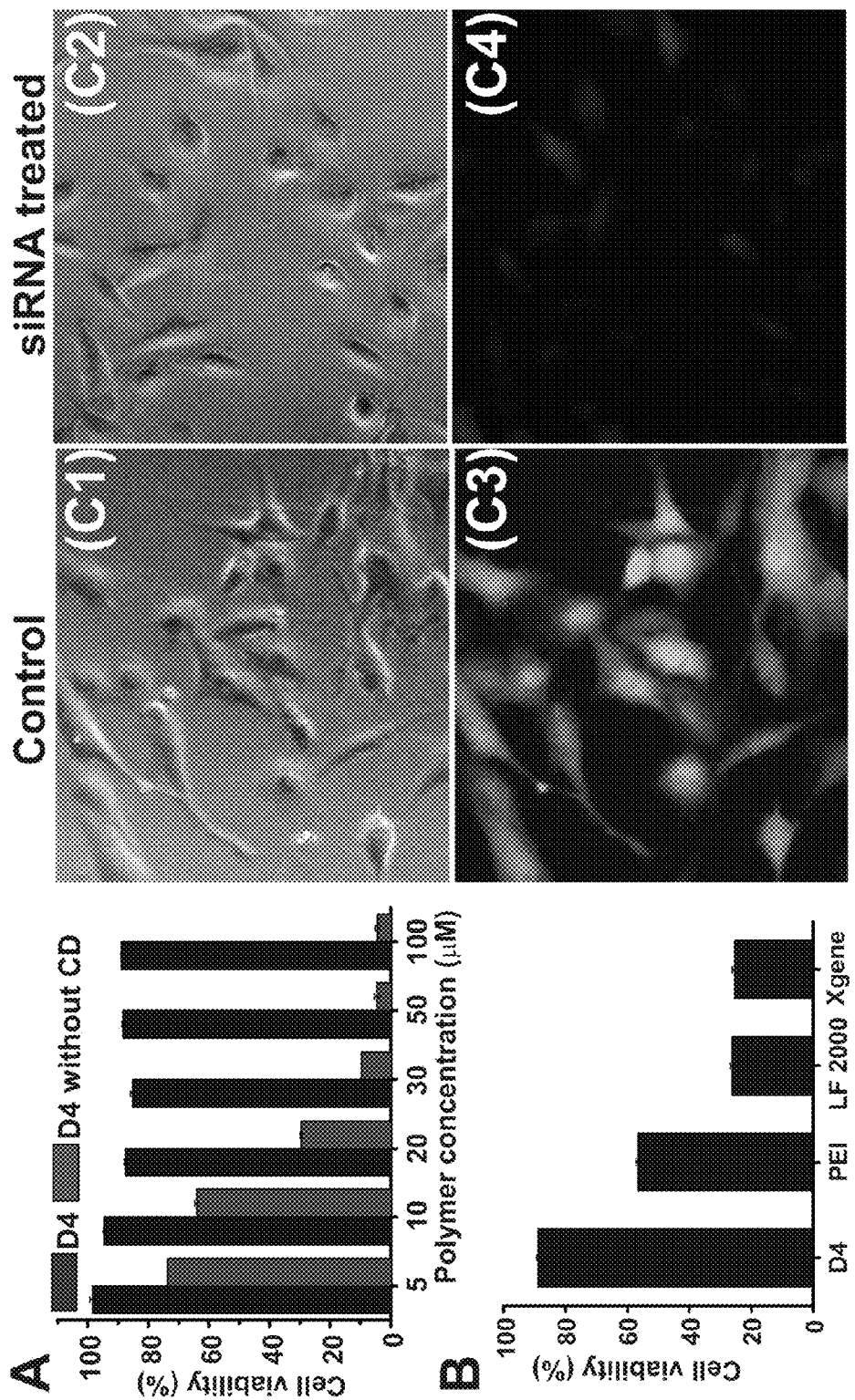
FIGS. 14 A-C show cytotoxicity and transfection efficiency of DexAM-4 (D4). (A) Effect of cyclodextrin grafting on polymer-mediated toxicity. (B) Comparison of toxicities of DexAM-4 with commercially used transfection agents at optimized concentrations of delivery agent and siRNA. (LF 2000—Lipofectamine 2000 and Xgene—Xtremegene). (C) Phase contrast (C1,C2) and fluorescent (C3,C4) images showing siRNA-mediated decrease in green fluorescence in treated and control (untreated) U87-EGFP cells.

Cytotoxicity of the DexAM molecules was assessed using MTS assay. First the effect of the β-CD moiety on cytotoxicity of DexAMs was confirmed by comparing the cytotoxicity of the DexAM (containing CD) to that of the DexAM without CD. The cytotoxicity assay data clearly showed that the DexAM constructs with CD show significantly less cytotoxicity as compared to those without CD (FIG. 14A). The cytotoxicity of the DexAMs was also compared with the commercially available transfection agents, Polyethyleneimine (PEI), Lipofectamine 2000 (LF) and Xtremegene (Xgene) at the recommended concentrations for transfection, and it was found that those agents were significantly more cytotoxic at those concentrations as compared to DexAMs (FIG. 14B).

Figure 15:
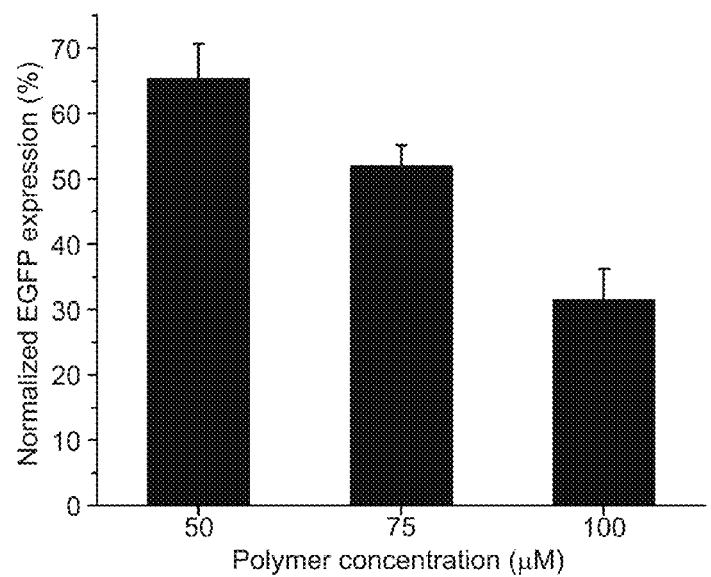
FIG. 15 shows quantification of siRNA-mediated EGFP gene silencing. U87-EGFP cells were incubated with DexAM-siRNA polyplexes for 12 h and analyzed 72 h post transfection using fluorescence microscopy. The knockdown efficiency of DexAM-siRNA polyplexes at different concentrations was quantified using Image J software after background substraction. The results are expressed as mean of three independent experiments (n=3).
Figure 16:
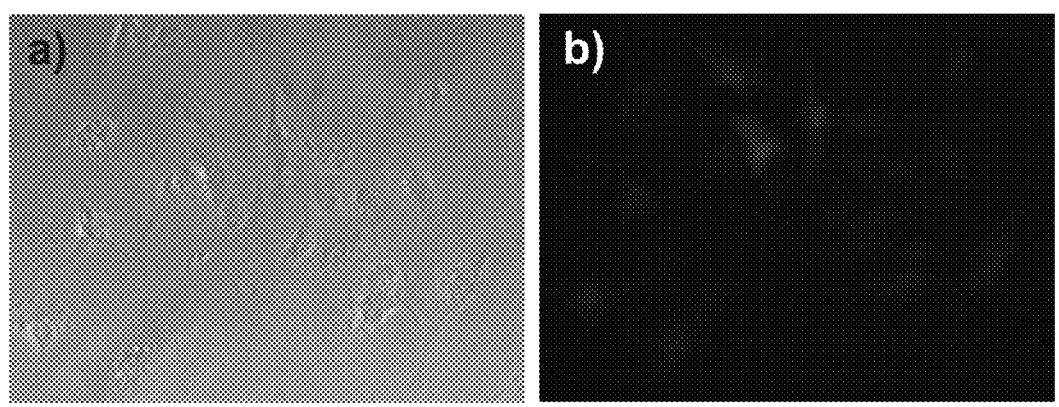
FIGS. 16A and B show phase contrast (A) and fluorescent (B) images of siRNA-mediated EGFP gene silencing using Xtremegene. U87-EGFP cells were incubated with Xtremegene-siRNA polyplexes for 12 h and analyzed 96 h post transfection using fluorescence microscopy. The polyplexes were formed at a ratio of 1:2 of siRNA to Xtremegene in serum-free media.

The optimization of gene silencing with the siRNA-DexAM constructs and assessment of knockdown efficiency were performed by measuring the suppression of enhanced green fluorescent protein (EGFP) in glioblastoma cell-lines (U87-EGFP), which were genetically modified to constitutively express EGFP. The decrease of green fluorescence intensity due to siRNA-mediated EGFP silencing was monitored over a time-period of 48-96 h to quantify the knockdown efficiency of the DexAM/siRNA constructs (FIG. 15). Approximately 70% of the U87-EGFP cells showed no EGFP signal after 96 h of siRNA treatment as compared to the control cells at a polymer concentration of 100 μM (FIG. 14C) with negligible cytotoxicity (~95% cell viability). In parallel, the transfection efficiency and the corresponding cytotoxicity of the delivery platform was compared with that of the commercially available transfection agent (Xtremegene) under the same condition, in which Xtremegene-based transfection demonstrated similar levels of EGFP knockdown (~70% knockdown efficiency), albeit with significant toxicity (~30% cell viability) (FIGS. 16A and B).

Brain tumor cells, particularly glioblastoma cells, present high levels of epidermal growth factor receptors (EGFRs) on their cell surfaces. For targeted delivery to glioblastoma cells, DexAM-4 was modified with appropriate ratios of EGFR antibodies (DexAM-4:EGFR-Ab=1:5) and incubated in U87 (glioblastoma cell line, target cells) and other less-tumorigenic PC-12 cells (control cells) which tend to have low levels of expression of EGFRs. The DexAM-4 constructs were also labeled with a fluorescent dye (Alexa Fluor 594) to monitor intracellular uptake using fluorescence microscopy.

Figure 17:
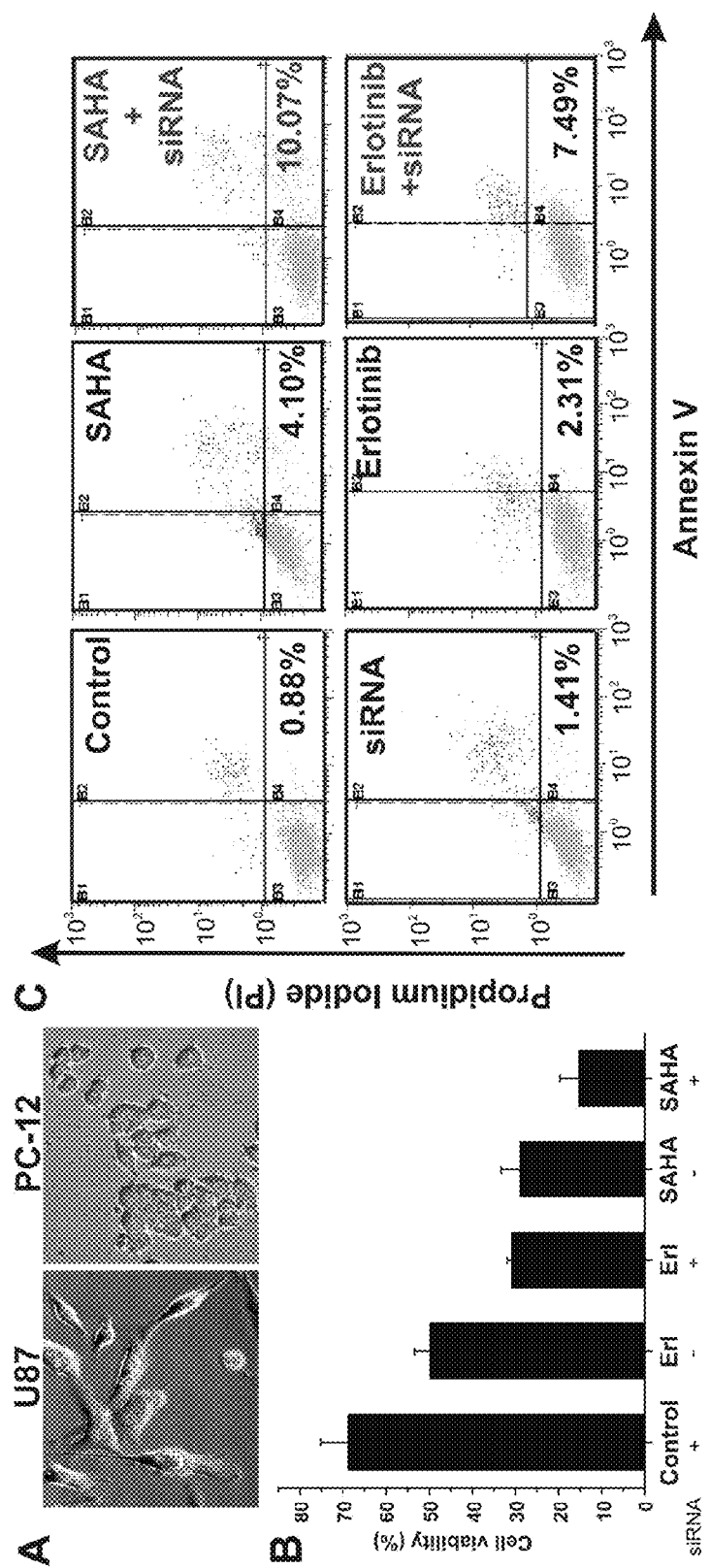
FIGS. 17A-C show targeted delivery of DexAMs and cooperative effect of anticancer drugs and siRNA on glioblastoma cells. (A) Targeted delivery of DexAMs modified with EGFR antibodies in highly-tumorigenic U87-EGFP cells and less-tumorigenic PC-12 cells. (B) Viability of glioblastoma cells following individual treatments and co-delivery of drugs and siRNA, based upon MTS assay. (C) Flow cytometry based Annexin-V/PI assay demonstrating the apoptotic effect of combined and individual siRNA and drug treatments. Percentages represent Annexin-V-positive (apoptotic cells). For all experiments, the polymer concentration was kept constant (100 µM), whereas the concentrations of SAHA, Erlotinib and siRNA were 5 µM, 30 µM and 200 nM respectively.

The data demonstrated that EGFR-antibody modified DexAM-4 were selectively translocated into U87 (target glioblastoma cells) with high efficiency as compared to the PC-12 (control cells) (FIG. 17A).

Having demonstrated the target-specific delivery and efficient gene silencing capability of the siRNA-DexAM constructs, the co-delivery of siRNA and anticancer drugs for targeting key oncogenic signaling pathways (e.g. EGFRvIII-(phoshphatidylinositol-3-kinase)PI3K/AKT) to achieve a cooperative chemotherapeutic effect was investigated. A combinatory therapeutic approach based on siRNA and anticancer cancer drugs targeting oncogenic pathways in glioblastoma multiforme (GBM), an extremely aggressive and difficult-to-treat form of primary brain tumor was investigated. The aim was to down-regulate the EGFRvIII-PI3K/AKT pathway, implicated in the proliferation and apoptosis of brain tumor cells, by delivering siRNA against epidermal growth factor receptor variant III (EGFRvIII), which is known to enhance the tumorigenicity of GBM (Engelman (2009) *Nat. Rev. Cancer* 9:550-562). Histone deacetylase (HDAC) inhibitors like suberoylanilide hydroxamic acid (SAHA) and EGFR tyrosine kinase inhibitors like erlotinib have been reported to enhance the efficacy of other EGFR antagonists (Lai et al. (2010) *Cancer Res.* 70:3647-3656). To this end, either SAHA or erlotinib was used for co-delivery with siRNA against EGFRvIII oncogene to deactivate the target signaling pathway in a selective and efficient manner.

Figure 18:
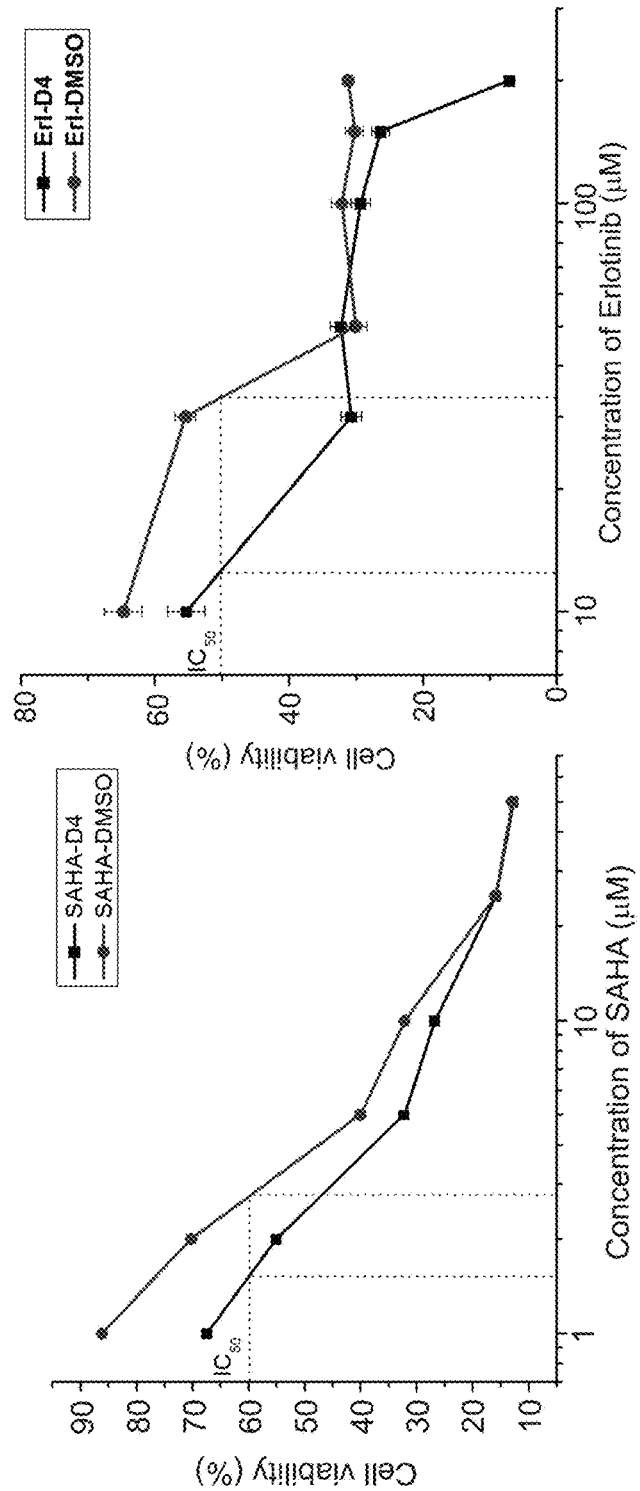
FIG. 18 shows dose response curves for Erlotinib and SAHA in U87-EGFRvIII cells. For cell viability studies, SAHA and Erlotinib were dissolved in DMSO as well as complexed within cyclodextrin moiety of DexAM-4. Cell viability is represented as the absorbance of the formazan product formed, with that of control (untreated) cells considered as 100%. The data represent mean of three independent experiments.

The anti-proliferative capability of anti-cancer drugs (SAHA and Erlotinib) and siRNA against EGFRvIII in glioblastoma cells, either individually or in combination by using cell viability assay was compared (FIG. 17B). From the data, a cooperative inhibition of glioblastoma cell proliferation when SAHA (5 μM) was co-delivered with the siRNA (200 nM; polymer concentration 100 μM), as compared to treating the cells with only SAHA at the same concentration (5 μM), was clear. Similarly, co-delivery of erlotinib (30 μM) and siRNA (200 nM) also inhibited tumor cell proliferation to a higher extent (FIG. 17B) Additionally, the effect of co-delivery of both siRNA and anticancer drugs on inducing cell death in glioblastoma cells was monitored using an apoptosis assay (Annexin-V/Propidium Iodide assay). Significantly higher proportion of cell population treated with both siRNA and SAHA were Annexin-V-FITC-positive as compared to the individual treatments as well as untreated cells. These results indicate greater induction of apoptosis in cells treated with both siRNA and SAHA, as compared to those with only SAHA and only siRNA treatment (FIG. 17C). A similar trend in the cooperative induction of apoptosis was seen in case of combined erlotinib/siRNA treatment (FIG. 17C). It was also found that complexation of SAHA and erlotinib within the CD cavity improved their aqueous solubility and hence increased their potency, measured as $IC_{50}$ values, by approximately 2-fold as compared to its DMSO solution (FIG. 18). Thus, these results show the cooperative effect on selective induction of the apoptosis of brain tumor cells by a combination of siRNA and anti-cancer drugs and the capability of the delivery molecules (DexAMs) for target-specific delivery and improved chemotherapeutic efficacy.

What is claimed is:

1. A method for delivering erlotinib and a nucleic acid therapeutic to a cell comprising contacting a cell with a delivery vehicle comprising one or more cyclodextrin moieties conjugated to a dendritic polyamine, wherein the dendritic polyamine has at least 4 primary amine groups, erlotinib noncovalently complexed with the cyclodextrin moiety of the vehicle, and a nucleic acid therapeutic noncovalently complexed with the dendritic polyamine.

2. The method of claim 1 wherein the cell is a human cell.

3. The method of claim 1 wherein the cell is a cancer cell.

4. The method of claim 1 wherein the cyclodextrin is β-cyclodextrin.

5. The method of claim 1 wherein the drug delivery vehicle further comprises siRNA noncovalently complexed with the dendritic polyamine.

6. The method of claim 1 wherein the drug delivery vehicle further comprises a targeting ligand conjugated thereto.

* * * * *